(12) United States Patent
Kondou et al.

(10) Patent No.: US 10,020,697 B2
(45) Date of Patent: Jul. 10, 2018

(54) DOUBLE-STATOR ELECTRIC ROTATING MACHINE

(71) Applicant: DENSO CORPORATION, Kariya, Aichi-pref. (JP)

(72) Inventors: Keiji Kondou, Nagoya (JP); Shin Kusase, Obu (JP); Takeo Maekawa, Okazaki (JP); Hiroshi Kaneiwa, Kariya (JP); Masayoshi Yamamoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 207 days.

(21) Appl. No.: 14/831,114

(22) Filed: Aug. 20, 2015

(65) Prior Publication Data

US 2016/0065010 A1    Mar. 3, 2016

(30) Foreign Application Priority Data

Aug. 27, 2014 (JP) .................. 2014-172530

(51) Int. Cl.
*H02K 1/18* (2006.01)
*H02K 16/04* (2006.01)

(52) U.S. Cl.
CPC .............. *H02K 1/187* (2013.01); *H02K 1/18* (2013.01); *H02K 16/04* (2013.01); *H02K 1/185* (2013.01)

(58) Field of Classification Search
CPC .......... H02K 1/18; H02K 1/185; H02K 1/187; H02K 16/04
See application file for complete search history.

(56) References Cited

U.S. PATENT DOCUMENTS

| 2011/0285238 A1 | 11/2011 | Kusase et al. |
| 2012/0080977 A1 | 4/2012 | Kusase |
| 2013/0099618 A1 | 4/2013 | Kusase |
| 2013/0113333 A1 | 5/2013 | Kondou et al. |

FOREIGN PATENT DOCUMENTS

| JP | S50-7007 A | 1/1975 | |
| JP | H07-143696 A | 6/1995 | |
| JP | 2004-274884 A | 9/2004 | |
| JP | 2006-352953 A | 12/2006 | |
| JP | 2010098853 A * | 4/2010 | ............... H02K 1/04 |
| JP | 2011-244643 A | 12/2011 | |
| JP | 2013090531 A | 5/2013 | |
| JP | 2014-007957 A | 1/2014 | |
| JP | 2014-045651 A | 3/2014 | |

* cited by examiner

Primary Examiner — Ramon M Barrera
(74) Attorney, Agent, or Firm — Oliff PLC

(57) ABSTRACT

A double-stator electric rotating machine with a retainer. The retainer includes a connector which joints between an outer stator and an inner stator. The retainer is placed in contact with an outer peripheral surface of the outer stator and an inner peripheral surface of the inner stator to retain the outer and inner stators together. Specifically, the retainer works to join the outer stator and the inner stator together and also to tightly hold the outer periphery of the outer stator and the inner periphery of the inner stator, thus minimizing misalignment of the outer and inner stators in axial and radial directions there of.

14 Claims, 23 Drawing Sheets

DOUBLE-STATOR ELECTRIC ROTATING MACHINE

CROSS REFERENCE TO RELATED DOCUMENT

The present application claims the benefit of priority of Japanese Patent Application No. 2014-172530 filed on Aug. 27, 2014, the disclosure of which is incorporated herein by reference.

BACKGROUND

1. Technical Field

This disclosure relates generally to an electric rotating machine which is equipped with an outer stator, an inner stator, and a rotor disposed between the outer and inner stators.

2. Background Art

Japanese Patent First Publication No. 2013-090531, assigned to the same assignee as that of this application, teaches an example of techniques for a double-stator electric motor which is equipped with stators mounted inside and outside a rotor in a radial direction thereof in order to improve the output performance thereof. The double-stator electric motor includes an inner stator core and an outer stator core which have axial ends jointed together by a retainer plate through welding.

The retainer plate is supported only by the axial ends of the inner and outer stator cores, thus resulting in a difficulty in achieving alignment of the centers of the stator cores with the axis of rotation thereof or setting a positional relation between the inner and outer stator cores in a circumferential direction thereof, which may lead to misalignment between the inner and outer stator cores. For instance, misalignment between the inner and outer stator cores in the radial direction thereof results in formation of a non-uniform gap between the stator and the rotor, which produces magnetic vibration. The misalignment between the inner and outer stator cores in the circumferential direction thereof results in overlap in peak between inner and outer electromagnetic powers, which may lead to an increase in the torque ripple.

The above structure also encounters the drawback in that the retainer plate is easy to flex or deform, thus causing the stator cores to be shifted from the correct position. This may result in magnetic vibration or an increase in torque ripple, as described above, which, in the worst case, leads to a physical contact between the stators and the rotor, so that they are damaged. The axial misalignment between the rotor and the stators may result in a decrease in effective region through which the magnetic flux flows, so that the output torque drops or a thrust force is created to cause mechanical vibration.

SUMMARY

It is therefore an object to provide an improved structure of a double-stator electric rotating machine which is designed to minimize misalignment between two stators in a radial, circumferential, or axial direction thereof.

It is another object to provide an improved structure of a double-stator electric rotating machine which is engineered to avoid undesirable flexure or deformation.

According to one aspect of the disclosure, there is provided a double-stator electric rotating machine which comprises: (a) an outer stator which is equipped with an outer multi-phase winding; (b) an inner stator which is equipped with an inner multi-phase winding, the inner stator being disposed inside the outer stator; (c) a rotor which is disposed between the outer stator and the inner stator with gaps between itself and the outer stator and between itself and the inner stator; and (d) a retainer which includes a connector which joints between the outer stator and the inner stator. The retainer is placed in contact with at least one of at least a portion of an outer peripheral surface of the outer stator and at least a portion of an inner peripheral surface of the inner stator to retain the outer and inner stators together.

Specifically, the retainer works to join the outer stator and the inner stator together and also to tightly hold the outer periphery of the outer stator and the inner periphery of the inner stator, thus minimizing misalignment of the outer and inner stators in axial and radial directions thereof.

According to the second aspect of the disclosure, at least one of the outer peripheral surface of the outer stator and the inner peripheral surface of the inner stator has at least one locked portion. The retainer has a locking portion which engages the locked portion. This holds the outer and inner stator from being shifted in the circumferential direction, the axial direction, or the radial direction thereof.

According to the third aspect of the invention, the retainer also retains a corner of at least one of axially opposed ends of at least one of an outer periphery of the outer stator and an inner periphery of the inner stator. This avoids the displacement of the outer and inner stators in the axial and radial directions thereof.

The first multi-phase winding and the second multi-phase winding may be made separately or made integrally of a single winding of wire or conductor. Each of the first multi-phase winding and the second multi-phase winding may be implemented by a three- or more phase winding. Each of the first multi-phase winding and the second multi-phase winding may be made of a single piece or a plurality of pieces of wire or conductor. The electric rotating machine may be engineered as an electric generator, an electric motor, or an electric generator motor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 10:
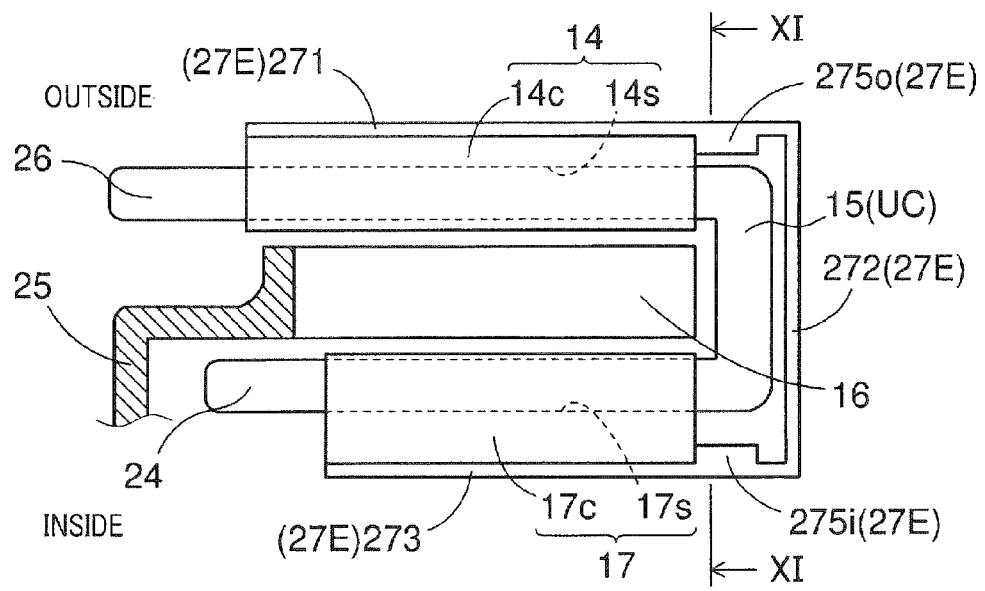
FIG. 10 is a partially schematic side view of a retainer of an electric rotating machine according to the fifth embodiment.

Double-stator electric rotating machines of several embodiments will be described below with reference to drawings. Each drawing illustrates components required only for explanation of each embodiment and does not necessarily show all components making up the embodiment. Hatching is made only on parts for the sake of visibility in the drawings. There are, therefore, non-hatched cross sections of parts in the drawings. "upper", "lower", "right", and "left", as referred to in the following discussion, are based on each drawing. Upper and lower letters indicate different parts. For instance, a retainer 27E in FIG. 10 is different from a retainer 27e in FIG. 30. Each figure other than FIG. 1 partially illustrates the double-stator electric rotating machine which will also be referred to below as an electric rotating machine.

First Embodiment

Figure 1:
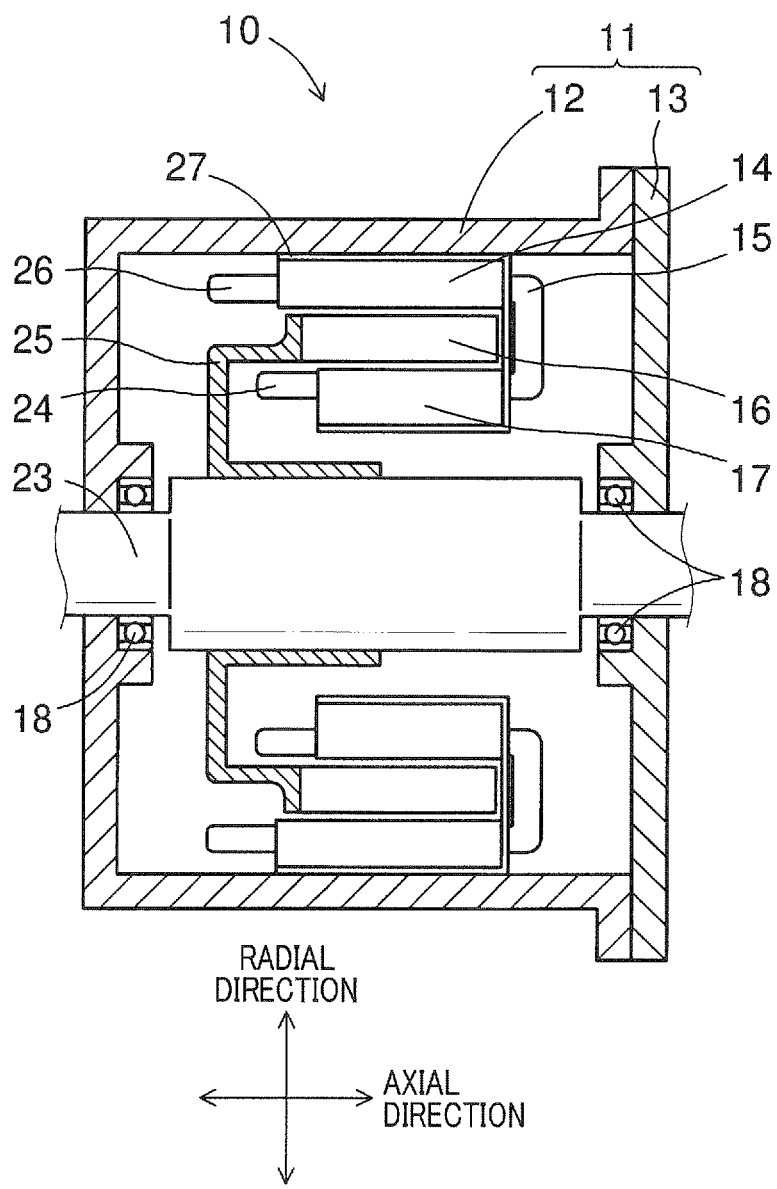
FIG. 1 is a longitudinal sectional view which illustrates an electric rotating machine according to the first embodiment.

The first embodiment will be discussed below with reference to FIGS. 1 to 5. FIG. 1 illustrates the electric rotating machine 10 that is designed as a double-stator electric motor generator. The electric rotating machine 10 includes a housing 11, an outer stator 14, a rotor 16, an inner stator 17, a rotating shaft 23, and a disc 25 which are disposed in the housing 11.

The housing 11 may be made in any shape as long as it stores therein the outer stator 14, the rotor 16, the inner stator 17, the rotating shaft 23, and the disc 25. The housing 11 includes a housing body 12 and a cover 13. The housing body 12 is, for example, in a cup-shape with an opening through which the above parts are permitted to be put into the housing body 11. The cover 13 is, for example, made of a circular plate or disc contoured to close the opening of the housing body 12 and may be detachable from the housing 11. Bearings 18 are mounted in the housing 11 to rotatably retain the rotating shaft 23. The rotating shaft 23 may be made in any shape with, for example, protrusions or recesses as long as it is rotatable. The bearings 18 have a hermetically sealing function to avoid the leakage of cooling medium or coolant outside the housing 11.

Within the housing 11, the coolant, as drawn by a pump (not shown), flows downwardly. Specifically, the electric rotating machine 10 connects with a cooling system equipped with the pump and an electric control unit or a computer working as a controller to control a flow rate of the coolant discharged from the pump. The housing 11 has two coolant inlets and a coolant outlet. The coolant delivered from the coolant inlets flows to cool the outer stator 14, the rotor 16, the inner stator 17, etc. Specifically, the coolant supplied through one of the coolant inlets cools the outer stator 14, an outer multi-phase winding 26, etc. Either or both of an inner surface of the housing 11 and an outer peripheral surface of the outer stator 14 may have radially extending coolant guides (e.g., protrusions or recesses) which serve to splash the coolant in all directions within the housing 11. The coolant supplied through the other coolant inlet cools connectors 15, the rotor 16, the inner stator 17, an inner multi-phase winding 24, etc. The coolant discharged from the coolant outlet is returned back to a reservoir of the coolant system. The reservoir may have a heater or a cooler to warm or cool the coolant stored therein. The coolant is made of oil, but may be cooling water or air. The cooling system may be equipped with a temperature sensor which measures the temperature of the coolant. The controller of the cooling system controls the operation of the pump to regulate the flow rate of the coolant as a function of the temperature thereof measured by the temperature sensor.

The rotor 16 is secured to the disc 25. The disc 25 is attached to the rotating shaft 23. The joining of the rotor 16 and the disc 25 to the disc 25 and the rotating shaft 23 may be achieved in some way. In other words, the rotor 16 and the rotating shaft 23 are joined together through the disc 25. The disc 25 may be in any shape as long as it connects between the rotor 16 and the rotating shaft 23.

The outer stator 14 and the inner stator 17 are disposed coaxially with each other and face each other through the rotor 16 in the radial direction thereof. The outer stator 14 has the outer multi-phase winding 26 mounted therein. The inner stator 17 has the inner multi-phase winding 24 mounted therein. Specifically, the outer stator 14 has an outer stator core 14c. The outer stator core 14c has formed therein slots 14s through which the outer multi-phase winding 26 is wound. Similarly, the inner stator 17 has an inner stator core 17c. The inner stator core 17c has formed therein slots 17s through which the inner multi-phase winding 24 is wound. Each of the outer stator core 14c and the inner stator core 17c will also be referred to below as an iron core. Either or both of the inner multi-phase winding 24 and the outer multi-phase winding 26 will also simply be referred to below as a winding.

Figure 2:
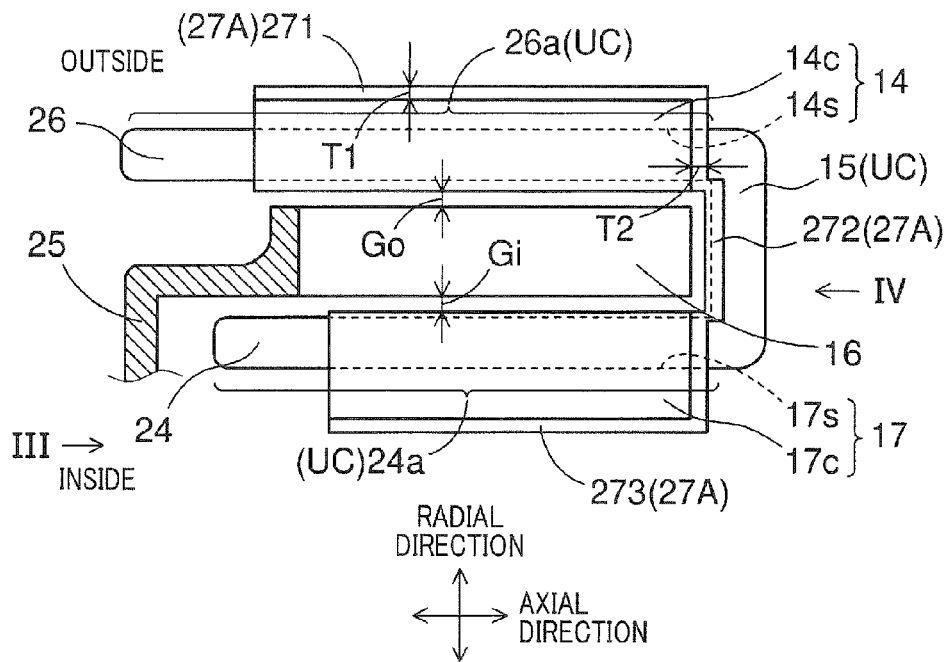
FIG. 2 is a partially schematic side view of the electric rotating machine of FIG. 1.

The outer multi-phase winding 26 and the inner multi-phase winding 24 are, as illustrated in FIG. 2, at least partially joined together through the connectors 15. The outer multi-phase winding 26 has outer winding portions 26a. Similarly, the inner multi-phase winding 24 has inner winding portions 24a. Each of the outer winding portions 26a is connected to one of the inner winding portions 26b through one of the connectors 15 to define a U-shaped conductor UC. The U-shaped conductors UC may each alternatively be made of a one-piece U-shaped wire or conducting member. The outer multi-phase winding 26, the connectors 15, and the inner multi-phase winding 24 may also be made of a one-piece conductor. In the second embodiment and following embodiments, for example, in FIGS. 6, 7, 8, 10, etc., arrows indicating the axial direction and the radial direction of the electric rotating machine 10, symbols Gi and Go indicating an inner gap and an outer gap will be omitted for the brevity of illustration, but they are the same as in FIG. 2.

The outer gap Go is created between the outer stator 14 and the rotor 16. The inner gap Gi is created between the rotor 16 and the inner stator 17. The outer gap Go and the inner gap Gi may be identical in size with each other or different from each other.

Figure 3:
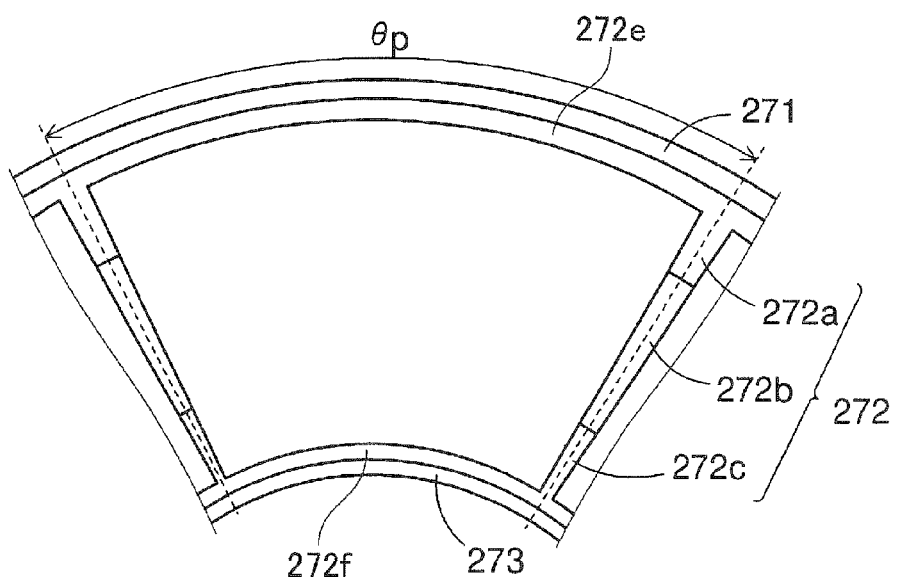
FIG. 3 is a partial illustration, as viewed from an arrow III in FIG. 2, which shows a retainer of the electric rotating machine of FIG. 1.

The retainer 27A illustrated in FIGS. 2, and 3 is one example of the retainer 27. The retainer 27A is made of an assembly of an outer retainer 271, connectors 272, an inner retainer 273. The outer retainer 271 and the inner retainer 273 will also be referred to below as retaining members. FIG. 3 shows only the retainer 27A for the brevity of illustration.

The retainer 27A may be made of any material in an optional way. In this embodiment, the retainer 27A is made of the same material or material containing the same component as that of the stator core (i.e., the outer stator core 14c and the inner stator core 17c). This causes the retainer 27A to form a portion of a magnetic circuit, thus enhancing the output of the electric rotating machine 10. The retainer 27A is made by a press The material of the retainer 27A and how the retainer 27A is made may be true for the retainers 27B to 27X, as will be described later.

The outer retainer 271, the connectors 272, and the inner retainer 273 each may be shaped to have an optional thickness. In the example of FIG. 2, the connectors 272 have a thickness T2 greater than a thickness T1 of the outer retainer 271 and the inner retainer 273. This enhances the stiffness of the connectors 272, thus minimizing misalignment thereof relative to the stators 14 and 17 in the axial and radial directions.

The outer retainer 271 is made of a hollow cylindrical member. Similarly, the inner retainer 273 is made of a hollow cylindrical member disposed inside the outer retainer 271. The outer retainer 271 is placed in direct contact with an outer peripheral surface of the outer stator 14 to hold the outer stator 14 firmly. The outer retainer 271 is, although not limited to, shrinkage-fit on the outer stator 14.

The connectors 272 joint the outer retainer 271 and the inner retainer 273 together, in other words, couples the outer rotor 14 and the inner rotor 17 together. The inner retainer 273 is placed in contact with the inner peripheral surface of the inner stator 17 to hold it. Each of the outer retainer 271 and the inner retainer 273 is made in a hollow cylindrical shape. The outer retainer 271 covers the outer peripheral surface of the outer stator 14 to secure it, while the inner retainer 273 covers the inner peripheral surface of the inner stator 17 to secure it, thereby minimizing the misalignment of the stators 14 and 17 in the radial direction thereof.

The outer stator 14, the rotor 16, and the inner stator 17 may be shaped to have an optional axial direction. It is preferable that an interval between the outer stator 14 and the rotor 16 and an interval between the rotor 16 and the inner stator 17 are set to facilitate the ease of flow of magnetic flux therebetween. The intervals are not limited to those in FIG. 2.

Each of the connectors 272, as clearly illustrated in FIG. 3, has a given length made up of an outer connecting portion 272a, an intermediate connecting portion 272b, and an inner connecting portion 272c. In the example of FIG. 3, the outer connecting portions 272a are connected together through a single annular member 272e. Similarly, the inner connecting portions 272c are connected together through a single annular member 272f. The outer connecting portion 272a is in contact with one of opposed end surfaces (i.e., a right end, as viewed in FIG. 2) of the outer stator 14 to retain it. The intermediate connecting portion 272b connects between the outer connecting portion 272a and the inner connecting portion 272c. The inner connecting portion 272c is placed in contact with one of opposed end surfaces (i.e., the right end, as viewed in FIG. 2) of the inner stator 17 to retain it. To summarize, the outer connecting portion 272a retains the end surface (i.e., the right end surface in FIG. 2) of the outer stator 14, while the inner connecting portion 272c retains the end surface (i.e., the right end surface in FIG. 2) of the inner stator 17, thereby keeping the outer and inner stators 14 and 17 from being shifted in the axial direction thereof.

Figure 4:
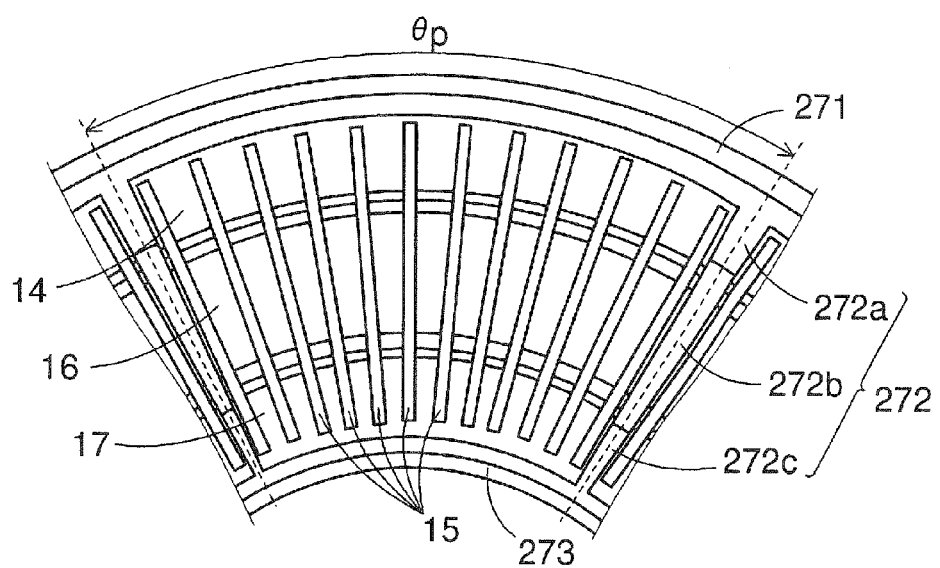
FIG. 4 is a partial illustration, as viewed from an arrow IV in FIG. 2, which shows a retainer of the electric rotating machine of FIG. 1.
Figure 5:
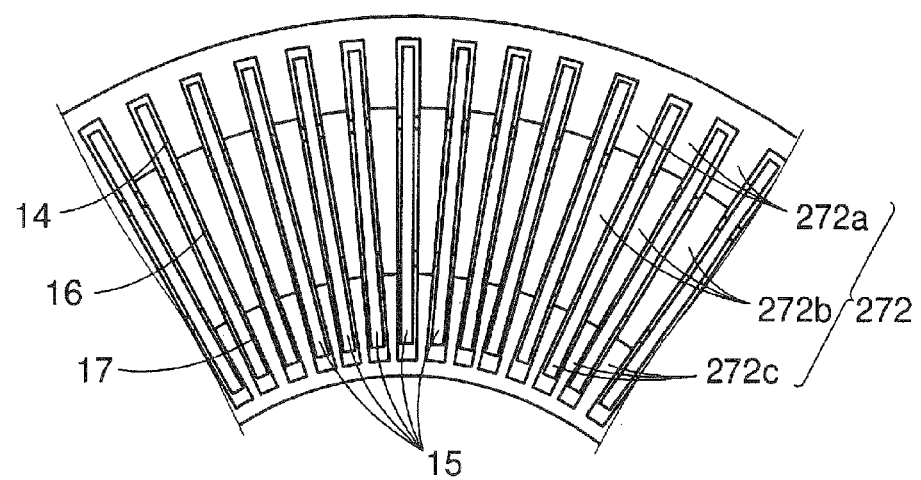
FIG. 5 is a partial illustration, as viewed from an arrow IV in FIG. 2, which shows a modification of a retainer of the electric rotating machine of FIG. 1.

The connectors 272 may be made in an optional shape. In examples of FIGS. 4 and 5, the intermediate connecting portions 272b are arrayed at regular pitches or angular intervals θp away from each other in the circumferential direction of the retainer 27A. For instance, the interval θp is selected to meet a relation 180 deg. <θp≤360 deg. in terms of electric angle. The intermediate connecting portions 272b, although not illustrated, may alternatively be unequally-spaced from each other. In the example of FIG. 5, the connectors 272 and the connectors 15 are arranged alternately in the circumferential direction of the electric rotating machine 10.

A combination of the outer retainer 271 and the outer connecting portions 272a serves to support a corner (i.e., an upper right corner in FIG. 2) of the outer stator 14, while a combination of the inner retainer 273 and the inner connecting portions 272c serves to support a corner (i.e., a lower right corner in FIG. 2) of the inner stator 17. This avoids undesirable shifts of the stators 14 and 17 in the axial and radial directions of the electric rotating machine 10.

Second Embodiment

Figure 6:
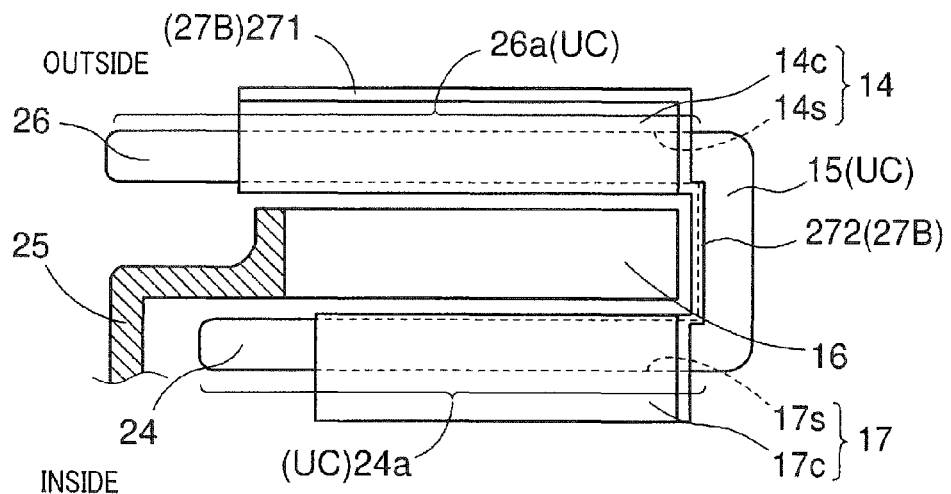
FIG. 6 is a partially schematic side view of a retainer of an electric rotating machine according to the second embodiment.

The electric rotating machine 10 of the second embodiment will be described with reference to FIG. 6. Unless otherwise specified, the same reference numbers as employed in the first embodiment will refer to the same parts, and explanation thereof in detail will be omitted here.

The electric rotating machine 10 includes the retainer 27B that is one example of the retainer 27. The retainer 27B is equipped with the outer retainer 271 and the connectors 272. The outer retainer 271 works to retain the outer peripheral surface of the outer stator 14 to hold the outer stator 14 from being shifted in the radial direction thereof. The connectors 272 are designed to have the structure, as illustrated in one of FIGS. 3 to 5. The outer connecting portion 272a of each of the connectors 272 is in contact with one of the opposed end surfaces of the outer stator 14 to retain it. The inner connecting portion 272c of each of the connectors 272 is placed in contact with one of the opposed end surfaces of the inner stator 17 to retain it. This keeps the outer and inner stators 14 and 17 from being shifted in the axial direction thereof.

Third Embodiment

Figure 7:
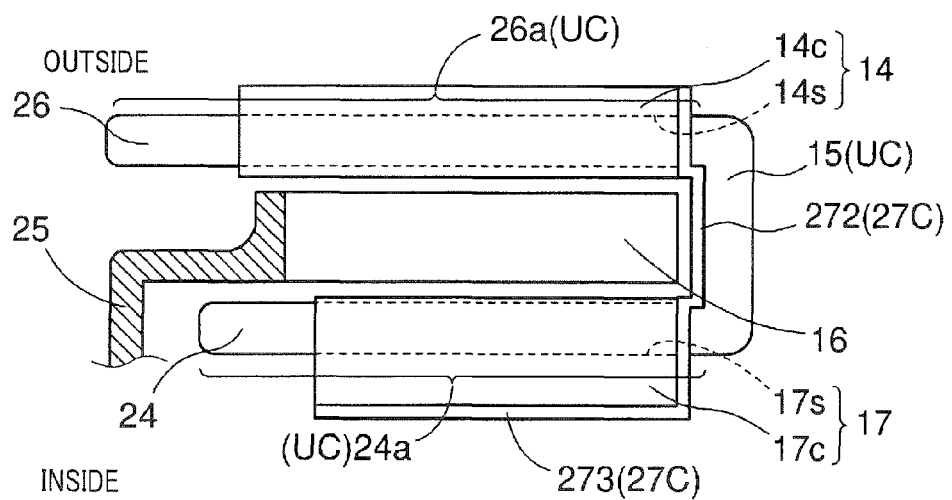
FIG. 7 is a partially schematic side view of a retainer of an electric rotating machine according to the third embodiment.

The electric rotating machine 10 of the third embodiment will be described with reference to FIG. 7. Unless otherwise specified, the same reference numbers as employed in the first and second embodiments will refer to the same parts, and explanation thereof in detail will be omitted here.

The electric rotating machine 10 includes the retainer 27C that is one example of the retainer 27. The retainer 27C is equipped with the connectors 272 and the inner retainer 273. The connectors 272 are designed to have the structure, as illustrated in one of FIGS. 3 to 5. The outer connecting portion 272a of each of the connectors 272 is in contact with one of the opposed end surfaces of the outer stator 14 to retain it. The inner connecting portion 272c of each of the connectors 272 is placed in contact with one of the opposed end surfaces of the inner stator 17 to retain it. This keeps the outer and inner stators 14 and 17 from being shifted in the axial direction thereof. The inner retainer 273 serves to support the outer peripheral surface of the inner stator 17 to hold the inner stator 17 from being shifted in the radial direction thereof.

Fourth Embodiment

The electric rotating machine 10 of the fourth embodiment will be described with reference to FIGS. 8 and 9. Unless otherwise specified, the same reference numbers as employed in the first to third embodiments will refer to the same parts, and explanation thereof in detail will be omitted here. FIG. 9 omits the inner multi-phase winding 24 and the outer multi-phase winding 26 for the brevity of illustration.

The electric rotating machine 10 includes the retainer 27D that is one example of the retainer 27. The retainer 27D is equipped with the outer retainer 271, the connectors 272, the outer locking portions 274o, and the inner locking portions 274i. The outer retainer 271 works to retain the outer peripheral surface of the outer stator 14, while the inner retainer 273 works to retain the inner peripheral surface of the inner stator 17, thereby holding the outer stator 14 and the inner stator 17 from being shifted in the radial direction thereof. Each of the connectors 272, like in the above embodiments, has the outer connecting portion 272a and the inner connecting portion 272c. The outer connecting portion 272a and the inner connecting portion 272c are, unlike in the above embodiments, placed out of contact with the stators 14 and 17 and disposed, as clearly illustrated in FIG. 8, outside the connectors 15 in the axial direction of the electric rotating machine 10 (i.e., the right side of the connectors 15 in FIG. 8).

Figure 8:
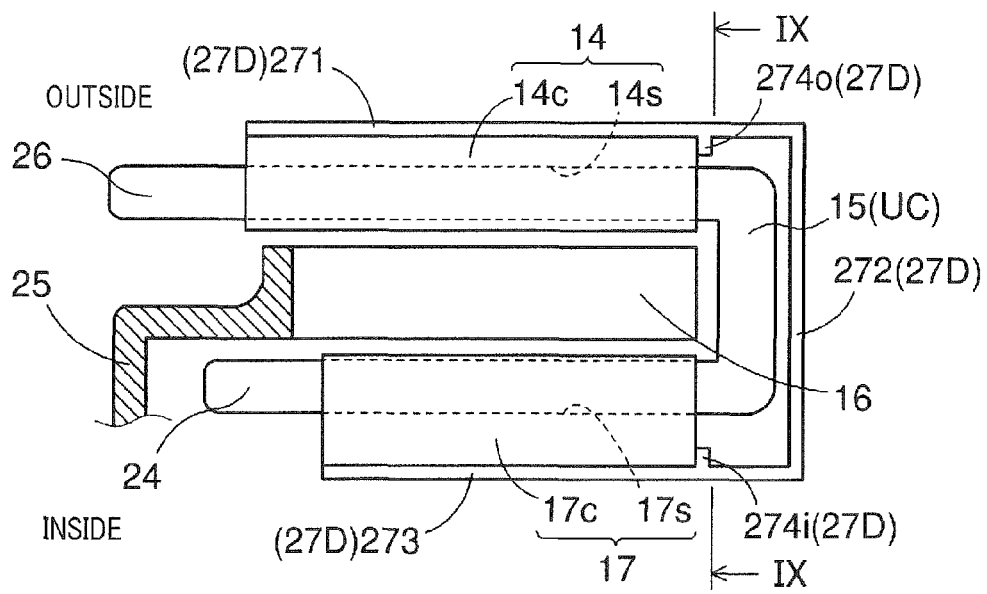
FIG. 8 is a partially schematic side view of a retainer of an electric rotating machine according to the fourth embodiment.
Figure 9:
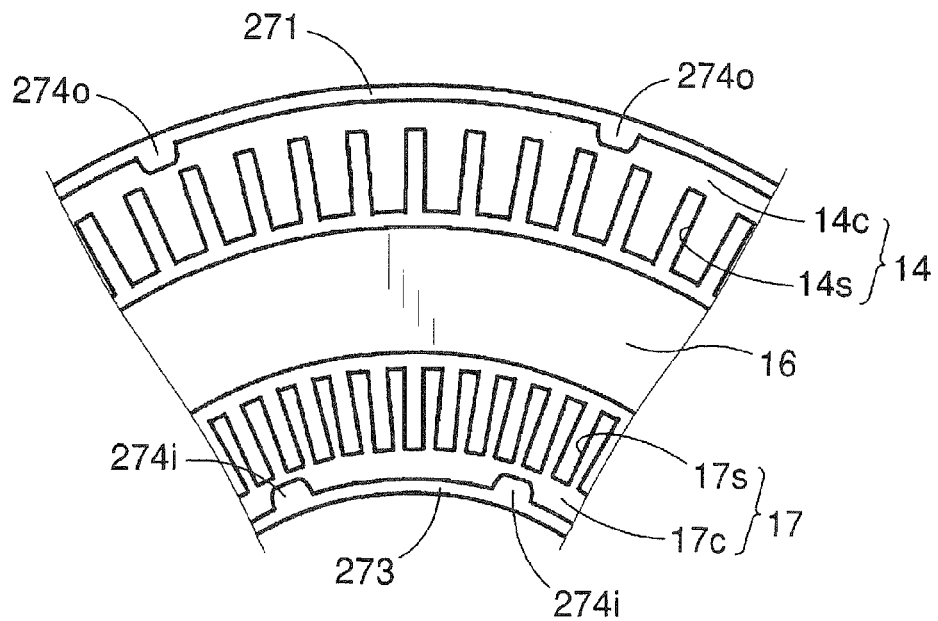
FIG. 9 is a partial transverse sectional view, as taken along the line IX-IX in FIG. 8.

Each of the outer locking portions 274o is, as illustrated in FIGS. 8 and 9, defined by a protrusion and disposed in contact with one of the opposed end surfaces (i.e., the right end in FIG. 8) of the outer stator 14, thereby keeping the outer stator 14 from being shifted in the axial direction thereof. Similarly, each of the inner locking portions 274i is defined by a protrusion and disposed in contact with one of the opposed end surfaces (i.e., the right end in FIG. 8) of the inner stator 17, thereby holding the inner stator 17 from being shifted in the axial direction thereof. Specifically, each of the outer and inner locking portions 270o and 270i may be made in any shape other than the one illustrated in FIGS. 8 and 9 as long as it works as a locking mechanism or stopper to hold a corresponding one of the outer stator 14 and the inner stator 17 from being undesirably displaced in the axial direction of the electric rotating machine 10.

A combination of the outer retainer 271 and the outer locking portions 274o serves to support a corner (i.e., the upper right corner in FIG. 8) of the outer stator 14, while a combination of the inner retainer 273 and the inner locking portions 274i serves to support a corner (i.e., the lower right corner in FIG. 8) of the inner stator 17. This avoids undesirable shifts of the stators 14 and 17 in the axial and radial directions of the electric rotating machine 10.

Fifth Embodiment

Figure 11:
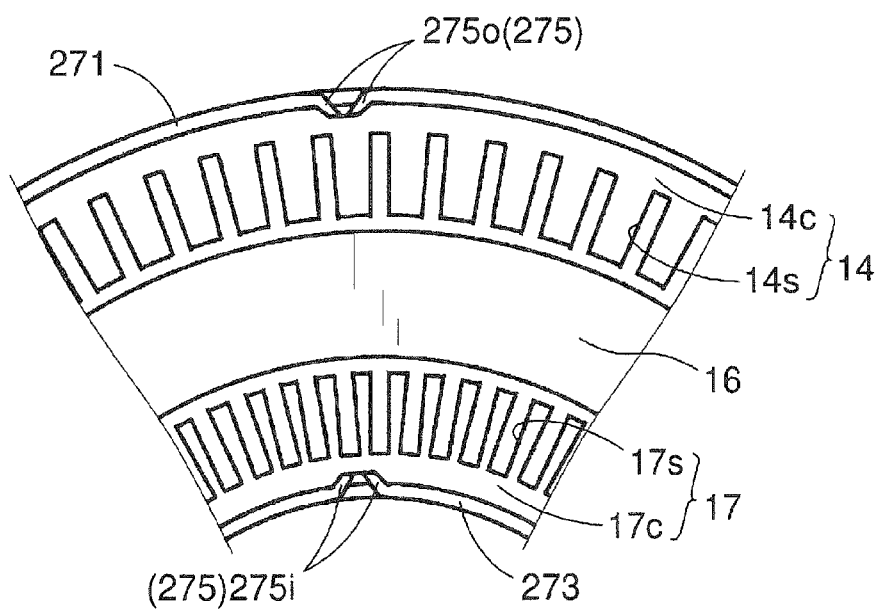
FIG. 11 is a partial transverse sectional view, as taken along the line XI-XI in FIG. 10.

The electric rotating machine 10 of the fifth embodiment will be described with reference to FIGS. 10 and 11. Unless otherwise specified, the same reference numbers as employed in the first to fourth embodiments will refer to the same parts, and explanation thereof in detail will be omitted here. FIG. 11 omits the inner multi-phase winding 24 and the outer multi-phase winding 26 for brevity of illustration.

The electric rotating machine 10 includes the retainer 27E that is one example of the retainer 27. The retainer 27E is equipped with the outer retainer 271, the connectors 272, the inner retainer 273, at least one outer locking portion 275o, and at least one inner locking portion 275i. The outer retainer 271 works to retain the outer peripheral surface of the outer stator 14, while the inner retainer 273 works to retain the inner peripheral surface of the inner stator 17, thereby holding the outer stator 14 and the inner stator 17 from being shifted in the radial direction thereof. Each of the connectors 272 may be made to have the same structure as in one of FIGS. 3 to 5. Specifically, each of the connectors 272 has the outer connecting portion 272a and the inner connecting portion 272c. The outer connecting portion 272a and the inner connecting portion 272c are placed out of contact with the stators 14 and 17, in other words, disposed, as clearly illustrated in FIG. 10, outside the connectors 15 in the axial direction of the electric rotating machine 10 (i.e., the right side of the connectors 15 in FIG. 10).

The outer locking portion 275o and the inner locking portion 275i are each designed as a locking mechanism or stopper in the form of a protrusion. The outer locking portion 275o is, as clearly illustrated in FIG. 11, formed by bending a portion of the outer retainer 271 inwardly, and placed in contact with one of the opposed end surfaces (i.e., the right end in FIG. 10) of the outer stator 14, thereby keeping the outer stator 14 from being shifted in the axial direction thereof. Similarly, the inner locking portion 275i is formed by bending a portion of the inner retainer 273 outwardly, and placed in contact with one of the opposed end surfaces (i.e., the right end in FIG. 10) of the inner stator 17, thereby keeping the inner stator 17 from being shifted in the axial direction thereof.

A combination of the outer retainer 271 and the outer locking portion 275o serves to support a corner (i.e., the upper right corner in FIG. 10) of the outer stator 14, while a combination of the inner retainer 273 and the inner locking portion 275i serves to support a corner (i.e., the lower right corner in FIG. 10) of the inner stator 17. This avoids undesirable shifts of the stators 14 and 17 in the axial and radial directions of the electric rotating machine 10.

Sixth Embodiment

The electric rotating machine 10 of the sixth embodiment will be described with reference to FIGS. 12 to 14. Unless otherwise specified, the same reference numbers as employed in the first to fifth embodiments will refer to the same parts, and explanation thereof in detail will be omitted here.

The electric rotating machine 10 includes the retainer 27F that is one example of the retainer 27. The retainer 27F is equipped with the outer retainer 271, the connectors 272, the inner retainer 273, the outer bend 276o, and the inner bend 276i. The outer retainer 271 retains the outer peripheral surface of the outer stator 14, while the inner retainer 273 retains the inner peripheral surface of the inner stator 17, thereby holding the outer stator 14 and the inner stator 17 from being shifted in the radial direction thereof. Each of the connectors 272 may be made to have the same structure as in one of FIGS. 3 to 5. Specifically, each of the connectors 272 has the outer connecting portion 272a and the inner connecting portion 272c. The outer connecting portion 272a and the inner connecting portion 272c are placed out of contact with the stators 14 and 17, in other words, disposed, as clearly illustrated in FIG. 12, outside the connectors 15 in the axial direction of the electric rotating machine 10 (i.e., the right side of the connectors 15 in FIG. 12).

Figure 12:
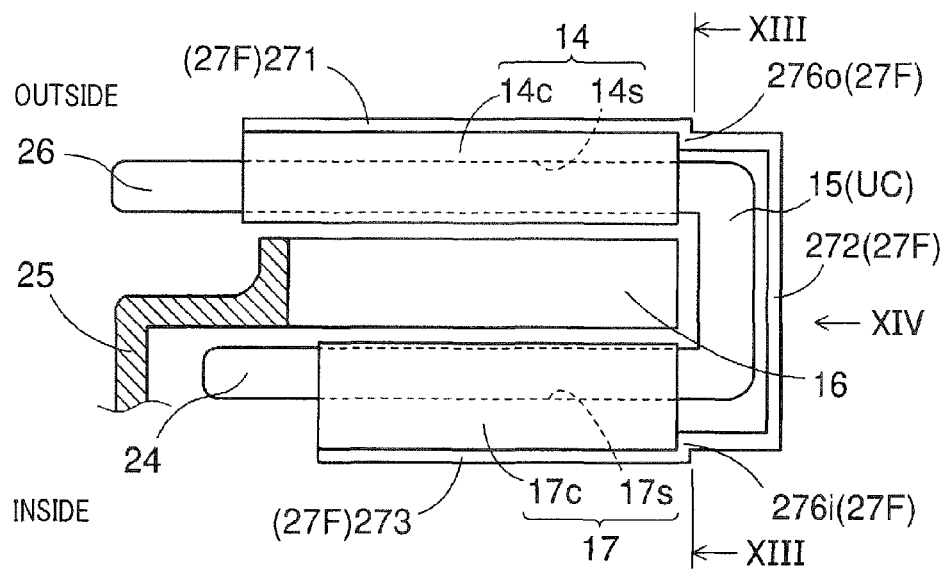
FIG. 12 is a partially schematic side view of a retainer of an electric rotating machine according to the sixth embodiment.
Figure 13:
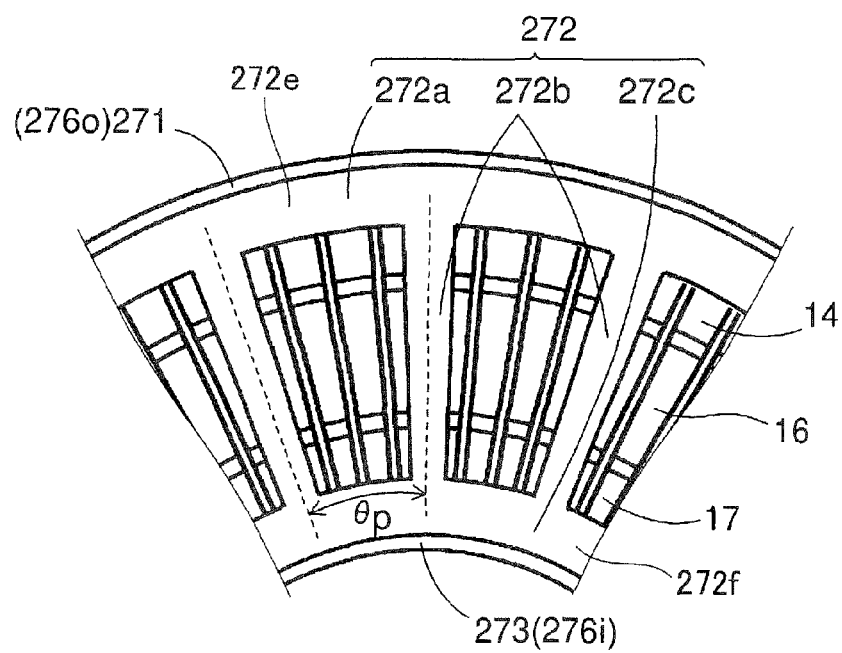
FIG. 13 is a partial transverse sectional view, as taken along the line XIII-XIII in FIG. 12.
Figure 14:
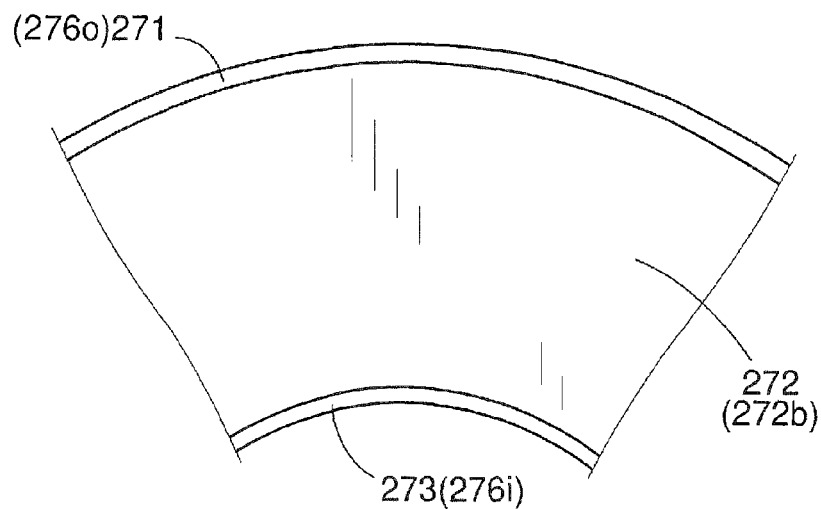
FIG. 14 is a partial illustration, as viewed from an arrow XIV in FIG. 12.

The outer bend 276o is, as illustrated in FIGS. 12 and 13, defined by an annular step or shoulder formed by a portion of the outer retainer 271 and works as a stopper to secure a corner (i.e., the upper right corner in FIG. 12) of the outer stator 14, thereby holding the outer stator 14 from being shifted in the axial and radial directions. Similarly, the inner bend 276i is defined by an annular step or shoulder formed by a portion of the inner retainer 273 and works as a stopper to secure a corner (i.e., the lower right corner in FIG. 12) of the inner stator 17, thereby holding the inner stator 17 from being shifted in the axial and radial directions. Either one of the outer bend 276o and the inner bend 276i may be omitted as needed.

The connectors 272 of the retainer 27F are made to have the structure of FIG. 13. Specifically, the connectors 272 have the outer connecting portions 272a, the intermediate connecting portions 272b, and the inner connecting portions 272c. The outer connecting portions 272a is made of a one-piece annular member. Similarly, the inner connecting portions 272c may be made of a one-piece annular member. The intermediate connecting portions 272b are arrayed, like in FIG. 4, at regular pitches or angular intervals θp away from each other in the circumferential direction of the retainer 27F. The retainer 27F may alternatively be shaped to have a single connector 272, as illustrated in FIG. 14. Specifically, the connector 272 does not have the outer connecting portions 272a and the inner connecting portions 272c, but have a single intermediate connecting portion 272b. The intermediate connecting portion 272b is made by an annular plate to connect between the outer retainer 271 and the inner retainer 273. The connectors 272 may be designed to have one of the structures in FIGS. 3 to 5.

Seventh Embodiment

Figure 15:
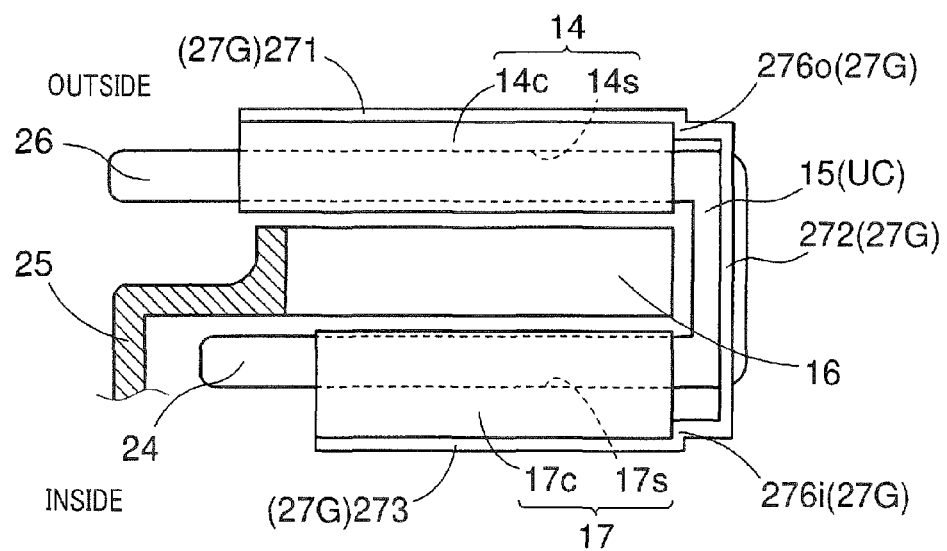
FIG. 15 is a partially schematic side view of a retainer of an electric rotating machine according to the seventh embodiment.

The electric rotating machine 10 of the seventh embodiment will be described with reference to FIG. 15. Unless otherwise specified, the same reference numbers as employed in the first to sixth embodiments will refer to the same parts, and explanation thereof in detail will be omitted here.

The electric rotating machine 10 includes the retainer 27G that is one example of the retainer 27. The retainer 27G is equipped with the outer retainer 271, the connectors 272, the inner retainer 273, the outer bend 276o, and the inner bend 276i. The structure of the retainer 27G is substantially identical with that of the retainer 27F in FIG. 12 except for the connectors 272. Specifically, the connectors 272 do not include the outer connecting portion 272a and the inner connecting portion 272c, but have only the intermediate connecting portions 272b each of which is disposed between two of the connectors 15. In other words, the connectors 272 have the structure, as illustrated in FIG. 3 or 4. The retainer 27G, thus, offers substantially the same beneficial effects as those in the sixth embodiment. Either one of the outer bend 276o and the inner bend 276i may be omitted as needed.

Eighth Embodiment

The electric rotating machine 10 of the eighth embodiment will be described with reference to FIG. 16. Unless otherwise specified, the same reference numbers as employed in the first to seventh embodiments will refer to the same parts, and explanation thereof in detail will be omitted here.

The electric rotating machine 10 includes the retainer 27H that is one example of the retainer 27. The retainer 27H is equipped with the outer retainer 277o, the connectors 272, the inner retainer 277i, the outer bend 276o, and the inner bend 276*i*. Compared with the retainer 27F in FIG. 12, the outer retainer 277*o* is shorter in length than the outer retainer 271 in the axial direction thereof. Similarly, the inner retainer 277*i* is shorter in length than the inner retainer 273 in the axial direction thereof. The outer retainer 277*o* partially covers the outer peripheral surface of the outer stator 14 to secure the outer stator 14. The inner retainer 277*i* partially covers the inner peripheral surface of the inner stator 17 to secure the outer stator 17. This avoids an undesirable shaft of the outer and inner stators 14 and 17 in the radial direction thereof. A combination of the outer retainer 271 and the inner retainer 277*i* may be used without use of the outer retainer 277*o*. Alternatively, a combination of the inner retainer 273 and the outer retainer 277*o* may be used without use of the inner retainer 277*i*. Either one of the outer bend 276*o* and the inner bend 276*i* may be omitted as needed.

Ninth Embodiment

Figure 18:
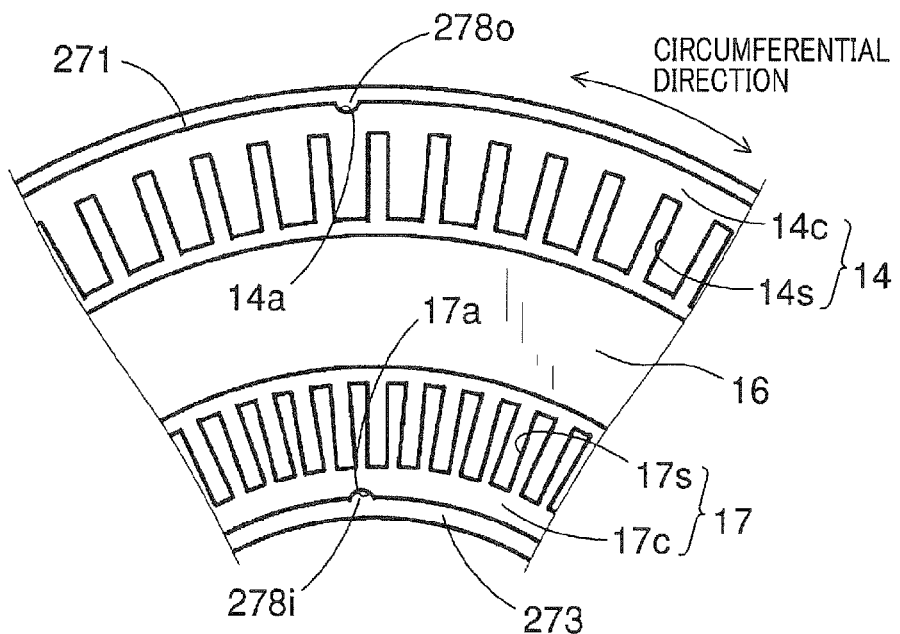
FIG. 18 is a partial transverse sectional illustration, as taken along the line XVIII-XVIII in FIG. 17.
Figure 19:
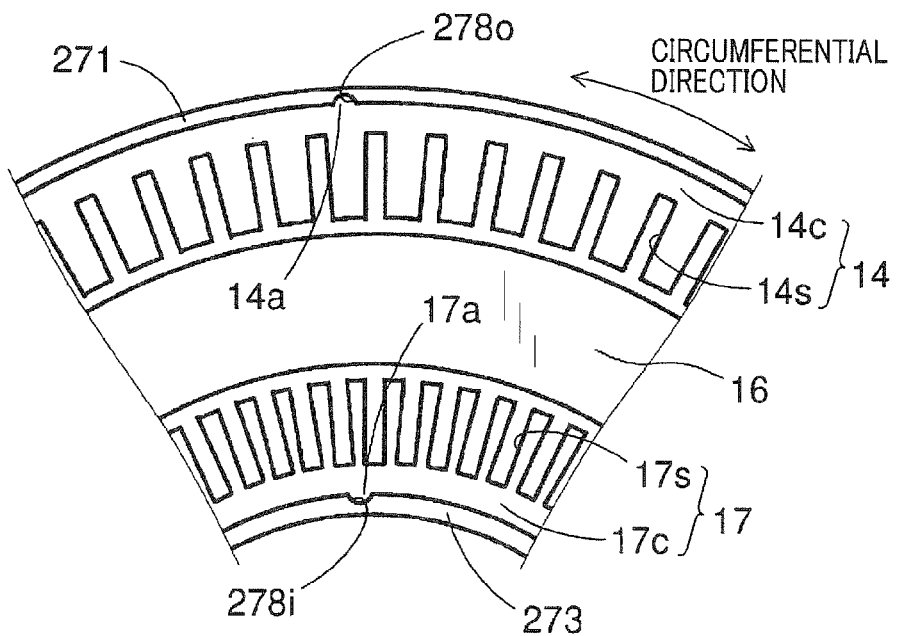
FIG. 19 is a partial transverse sectional illustration, as taken along the line XVIII-XVIII in FIG. 17, which shows a modification of a retainer.

The electric rotating machine 10 of the ninth embodiment will be described with reference to FIGS. 17 to 19. Unless otherwise specified, the same reference numbers as employed in the first to eighth embodiments will refer to the same parts, and explanation thereof in detail will be omitted here. FIGS. 18 and 19 omit the inner multi-phase winding 24 and the outer multi-phase winding 26 for brevity of illustration.

The electric rotating machine 10 includes the retainer 271 that is one example of the retainer 27. The retainer 271 is, as illustrated in FIG. 17, equipped with the outer retainer 271, the connectors 272, the inner retainer 273, the outer bend 276*o*, and the inner bend 276*i*. The outer retainer 271 has at least one outer locking portion 278*o* in the form of a ridge-shaped protrusion. Similarly, the inner retainer 273 has at least one inner locking portion 278*i* in the form of a ridge-shaped protrusion. The outer stator 14, as illustrated in FIGS. 18 and 19, has at least one locked portion 14*a* formed in the outer peripheral surface thereof in the form of a recess or groove. Similarly, the inner stator 17 has at least one locked portion 17*a* formed in the outer peripheral surface thereof in the form of a recess or groove. The locked portions 14*a* and 17*a* may be located at a reference angular position (e.g., a rotational angle of 0 deg. or electric angle of 0 deg.), which will also be referred to as reference locked portions below.

The outer locking portion 278*o* and the inner locking portion 278*i* are, as illustrated in FIG. 18, defined by protrusions. The locked portions 14*a* and 17*a* are defined by recesses or grooves. The outer locking portion 278*o* and the inner locking portion 278*i* may alternatively be, as illustrated in FIG. 19, defined by recesses or grooves. The locked portions 14*a* and 17*a* may alternatively be defined by protrusions. Specifically, the outer locking portion 278*o* and the locked portion 14*a* work as a locking mechanism or stopper to hold the retainer 271 from being shifted relative to the outer stator 14 in the circumferential direction thereof. Similarly, the inner locking portion 278*i* and the locked portion 17*a* work as a locking mechanism or stopper to hold the retainer 273 from being shifted relative to the inner stator 17 in the circumferential direction thereof.

Although not illustrated, the outer stator 14 may have a plurality of locked portions 14*a* formed in the outer peripheral surface thereof. Similarly or alternatively, the inner stator 17 may have a plurality of locked portions 17*a* formed in the outer peripheral surface thereof. One of the locked portions 14*a* and one of the locked portions 17*a* are preferably located at the reference angular position. Either one of the outer bend 276*o* and the inner bend 276*i* may be omitted as needed.

Tenth Embodiment

The electric rotating machine 10 of the tenth embodiment will be described with reference to FIGS. 20 and 21. Unless otherwise specified, the same reference numbers as employed in the first to ninth embodiments will refer to the same parts, and explanation thereof in detail will be omitted here. FIG. 21 omits the inner multi-phase winding 24 and the outer multi-phase winding 26 for the brevity of illustration.

The electric rotating machine 10 includes the retainer 27J that is one example of the retainer 27. The retainer 27J is, as illustrated in FIG. 20, equipped with the outer retainer 271, the connectors 272, the inner retainer 273, the outer bend 276*o*, the inner bend 276*i*, the outer insert 279*o* and the inner insert 279*i*.

The outer retainer 271, as clearly illustrated in FIG. 21, has at least one outer locking portion 278*o* formed in the inner peripheral surface thereof in the shape of a recess or groove. The outer stator 14 has at least one locked portion 14*a* formed in the outer peripheral surface thereof in the form of a recess or groove. The outer insert 279*o* is interposed between the outer locking portion 278*o* and the locked portion 14*a*. The outer insert 279*o* is made of a bar whose sectional area is optional.

Similarly, the inner retainer 273 has at least one outer locking portion 278*i* formed in the outer peripheral surface thereof in the shape of a recess or groove. The inner stator 17 has at least one locked portion 17*a* formed in the inner peripheral surface thereof in the form of a recess or groove. The inner insert 279*i* is interposed between the inner locking portion 278*i* and the locked portion 17*a*. The inner insert 279*i* is made of a bar whose sectional area is optional.

The outer locking portion 278*o*, the locked portion 14*a*, and the outer insert 279*o* work as a locking mechanism or stopper to hold the retainer 271 from being shifted relative to the outer stator 14 in the circumferential direction thereof. Similarly, the inner locking portion 278*i*, the locked portion 17*a*, and the inner insert 279*i* work as a locking mechanism or stopper to hold the retainer 273 from being shifted relative to the inner stator 17 in the circumferential direction thereof.

Although not illustrated, the outer stator 14 may have a plurality of locked portions 14*a* formed in the outer peripheral surface thereof. Similarly or alternatively, the inner stator 17 may have a plurality of locked portions 17*a* formed in the outer peripheral surface thereof. One of the locked portions 14*a* and one of the locked portions 17*a* are preferably located at the reference angular position. Alternatively, the electric rotating machine 10 may be equipped with a plurality of combinations (i.e. locking mechanisms or stoppers) each made up of the outer locking portion 278*o*, the outer insert 279*o*, and the locked portion 14*a* and/or a plurality of combinations (i.e., locking mechanisms or stoppers) each made up of the inner locking portion 278*i*, the inner insert 279*i*, and the locked portion 17*a*. Either one of the outer bend 276*o* and the inner bend 276*i* may be omitted as needed.

Eleventh Embodiment

The electric rotating machine 10 of the eleventh embodiment will be described with reference to FIGS. 22 and 23. Unless otherwise specified, the same reference numbers as employed in the first to tenth embodiments will refer to the same parts, and explanation thereof in detail will be omitted here. FIG. 23 omits the inner multi-phase winding 24 and the outer multi-phase winding 26 for the brevity of illustration.

The electric rotating machine 10 includes the retainer 27K that is one example of the retainer 27. The retainer 27K is equipped with the outer retainer 271, the connectors 272, the inner retainer 273, the outer bend 276o, the inner bend 276i, at least one outer locking portion 27ao, and at least one inner locking portion 27ai.

The outer locking portion 27ao and the inner locking portion 27ai are each designed as a locking mechanism or stopper in the form of a protrusion. The outer locking portion 27ao is, as clearly illustrated in FIG. 23, formed by bending portions of the outer retainer 271 inwardly. The outer stator 14 has the locked portion 14b formed in the outer peripheral surface thereof in the shape of a recess or groove. The outer locking portion 27ao is fit in an inner wall of the locked portion 14b to work as a locking mechanism or stopper to secure the outer retainer 271 to the outer stator 14.

Similarly, the inner locking portion 27ai is, as clearly illustrated in FIG. 23, formed by bending portions of the inner retainer 273 outwardly. The inner stator 17 has the locked portion 17b formed in the inner peripheral surface thereof in the shape of a recess or groove. The inner locking portion 27ai is fit in an inner wall of the locked portion 17b to work as a locking mechanism or stopper to secure the inner retainer 273 to the inner stator 17, thereby keeping the retainer 27K from being displaced in the circumferential direction thereof.

Twelfth Embodiment

The electric rotating machine 10 of the twelfth embodiment will be described with reference to FIGS. 24 and 25. Unless otherwise specified, the same reference numbers as employed in the first to eleventh embodiments will refer to the same parts, and explanation thereof in detail will be omitted here. FIG. 25 omits the inner multi-phase winding 24 and the outer multi-phase winding 26 for the brevity of illustration.

The electric rotating machine 10 includes the retainer 27L that is one example of the retainer 27. The retainer 27L is equipped with a plurality of outer retainers 271, a plurality of connectors 272, a plurality of inner retainers 273, an outer bend 276o, an inner bend 276i, a plurality of outer locking portions 27ao (not shown), and a plurality of inner locking portions 27ai (not shown).

Each of the outer retainers 271 is made of a plate or strip extending in the axial direction of the outer stator 14. The outer retainers 271 are connected together through a single outer annular member such as the annular member 272e in FIG. 3. The outer annular member has the outer bend 276o. The outer stator 14 has formed therein a plurality of locked portions 14d each of which is defined by a groove extending in the outer peripheral surface of the outer stator 14 in the axial direction thereof. Each of the outer retainers 271 is disposed in one of the locked portions 14d. Similarly, each of the inner retainers 273 is made of a plate or strip extending in the axial direction of the inner stator 17. The inner retainers 273 are connected together through a single inner annular member such as the annular member 272f in FIG. 3. The inner annular member has the inner bend 276i. The inner stator 17 has formed therein a plurality of locked portions 17d each of which is defined by a groove extending in the inner peripheral surface of the inner stator 17 in the axial direction thereof. Each of the inner retainers 273 is disposed in one of the locked portions 17d. Each of the outer retainers 271 is, as can be seen in FIG. 24, joined to a corresponding one of the inner retainers 273 through one of the connectors 272, the outer bend 276o and the inner bend 276i. Each of combinations of the outer retainers 271, the connectors 272, the inner retainers 273, the outer bend 276o, the inner bend 276i, the outer locking portions 27ao, and the inner locking portions 27ai works as a locking mechanism or stopper to hold the retainer 27L from being shifted in the circumferential direction of the outer and inner stators 14 and 17. Either one of the outer bend 276o and the inner bend 276i may be omitted as needed.

The lengths of the outer retainers 271 and the inner retainers 273 are optional. In the example of FIG. 24, the outer retainers 271 and the outer stator 14 are identical in length with each other in the axial direction thereof. Similarly, the inner retainers 273 and the inner stator 17 are identical in length with each other in the axial direction thereof. The length of the outer retainers 271 may alternatively be set shorter than that of the outer stator 14. The length of the inner retainers 273 may alternatively be set shorter than that of the inner stator 17.

The retainer 27L may alternatively be designed to have only one combination of the outer retainer 271, the connector 272, the inner retainer 273, the outer bend 276o, the inner bend 276i, the outer locking portion 27ao, the inner locking portion 27ai, the locked portion 14d, and the locked portion 17d.

Thirteenth Embodiment

The electric rotating machine 10 of the thirteenth embodiment will be described with reference to FIGS. 26 and 27. Unless otherwise specified, the same reference numbers as employed in the first to twelfth embodiments will refer to the same parts, and explanation thereof in detail will be omitted here. FIG. 27 omits the inner multi-phase winding 24 and the outer multi-phase winding 26 for the brevity of illustration.

The electric rotating machine 10 includes the retainer 27M that is one example of the retainer 27. The retainer 27M is equipped with the outer retainer 271, the connectors 272, the inner retainer 273, the outer bend 276o, the inner bend 276i, the outer locking portions 27ao, the inner locking portions 27ai, the outer hooks 27co, and the inner hooks 27ci.

Each of the outer hooks 27co is defined in the form of a claw and formed by an L-shaped portion of one of opposed ends of the hollow cylindrical outer retainer 271 (i.e., the left end in FIG. 26) which is farther from the connector 272. Each of the outer hooks 27co extends inwardly in the radial direction of the outer retainer 271. The outer hooks 27co are fit on the end surface of the outer stator 14 and work as locking mechanisms or stoppers to keep the outer stator 14 from being shifted in the axial direction of the outer stator 14.

Each of the inner hooks 27ci is defined in the form of a claw and formed by an L-shaped portion of one of opposed ends of the hollow cylindrical inner retainer 273 (i.e., the left end in FIG. 26) which is farther from the connector 272. Each of the outer hooks 27ci extends inwardly in the radial direction of the inner retainer 273. The inner hooks 27ci are fit on the end surface of the inner stator 17 and work as locking mechanisms or stoppers to keep the inner stator 17 from being shifted in the axial direction of the inner stator 17.

Either one of the outer bend 276o and the inner bend 276i may be omitted as needed. The configuration of the outer and inner hooks 27co and 27ci may be optional as long as they work to stop the outer and inner stators 14 and 17 from being displaced in the axial direction thereof.

The retainer 27M may alternatively be designed to have only one combination of the outer retainer 271, the connector 272, the inner retainer 273, the outer bend 276o, the inner bend 276i, the outer locking portion 27ao, the inner locking portion 27ai, the outer hook 27co, and the inner hook 27ci.

Fourteenth Embodiment

The electric rotating machine 10 of the fourteenth embodiment will be described with reference to FIGS. 28 and 29. Unless otherwise specified, the same reference numbers as employed in the first to thirteenth embodiments will refer to the same parts, and explanation thereof in detail will be omitted here. FIG. 29 omits the inner multi-phase winding 24 and the outer multi-phase winding 26 for the brevity of illustration.

The electric rotating machine 10 includes the retainer 27N that is one example of the retainer 27. The retainer 27N is equipped with the outer retainer 271, the connectors 272, the inner retainer 273, the outer bend 276o, the inner bend 276i, the outer locking portions 27ao, the inner locking portions 27ai, the outer hooks 27do, and the inner hooks 27di. The outer hooks 27do and the inner hooks 27di work as the locking portions or the claws, as described above.

Each of the outer hooks 27do is defined by an L-shaped portion of one of opposed ends of the hollow cylindrical outer retainer 271 (i.e., the left end in FIG. 28) which is farther from the connector 272. Each of the outer hooks 27do extends inwardly in the radial direction of the outer retainer 271. The outer hooks 27do are disposed in the locked portions 14e formed in the outer peripheral surface of the outer stator 14 in the shape of a recess and work as locking mechanisms or stoppers to keep the outer stator 14 from being shifted in the axial direction of the outer stator 14.

Each of the inner hooks 27di is defined by an L-shaped portion of one of opposed ends of the hollow cylindrical inner retainer 273 (i.e., the left end in FIG. 28) which is farther from the connector 272. Each of the outer hooks 27di extends inwardly in the radial direction of the inner retainer 273. The inner hooks 27di are disposed in the locked portions 17e formed in the inner peripheral surface of the inner stator 17 in the shape of a recess and work as locking mechanisms or stoppers to keep the inner stator 17 from being shifted in the axial direction of the inner stator 17.

Either one of the outer bend 276o and the inner bend 276i may be omitted as needed. The lengths of the outer and inner hooks 27do and 27di in the axial direction of the outer and inner stators 14 and 17 are not limited to the ones illustrated in FIG. 28. The outer and inner hooks 27do and 27di may have a length (i.e., a horizontal length, as viewed in FIG. 28) extending near the ends of the outer and inner stators 14 and 17 which are farther away from the connectors 272. The configuration of the outer and inner hooks 27do and 27di may be optional as long as they work to stop the outer and inner stators 14 and 17 from being displaced in the axial direction thereof.

The retainer 27M may alternatively be designed to have only one combination of the outer retainer 271, the connector 272, the inner retainer 273, the outer bend 276o, the inner bend 276i, the outer locking portion 27ao, the inner locking portion 27ai, the outer hook 27co, and the inner hook 27ci.

Fifteenth Embodiment

The electric rotating machine 10 of the fifteenth embodiment will be described with reference to FIGS. 30 and 31. Unless otherwise specified, the same reference numbers as employed in the first to fourteenth embodiments will refer to the same parts, and explanation thereof in detail will be omitted here.

The electric rotating machine 10 includes the retainer 27P that is one example of the retainer 27. The retainer 27P is equipped with the outer retainer 271, the connector 272, the inner retainer 273, the outer bend 276o, the inner bend 276i, the outer locking portions 27ao, the inner locking portions 27ai, the outer hooks 27co, and the inner hooks 27ci. The outer hooks 27co and the inner hooks 27ci correspond to the locking portions and also to the claws, as described above.

Figure 26:
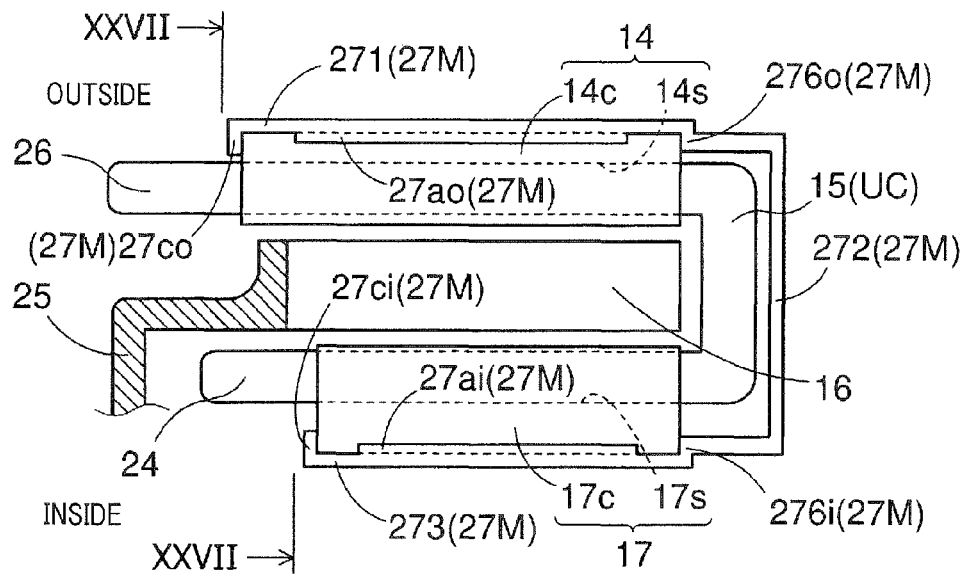
FIG. 26 is a partially schematic side view of a retainer of an electric rotating machine according to the thirteenth embodiment.
Figure 27:
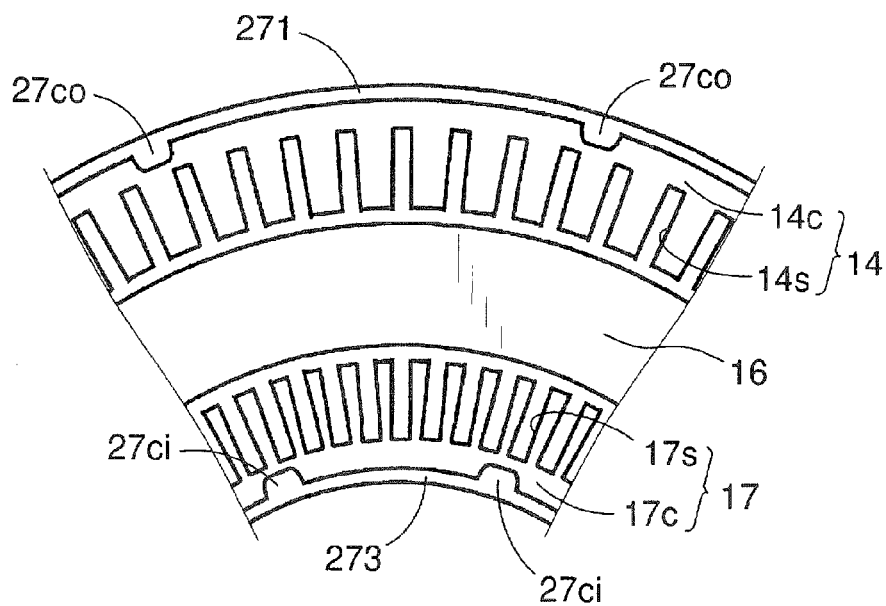
FIG. 27 is a partial transverse sectional view, as taken along the line XXVII-XXVII in FIG. 26.

The retainer 27P is substantially identical in structure with the retainer 27M in FIG. 26 except the connector 272. The outer bend 276o, the inner bend 276i, the outer locking portions 27ao, the inner locking portions 27ai, the outer hooks 27co, and/or the inner hooks 27ci may be omitted as needed.

Figure 31:
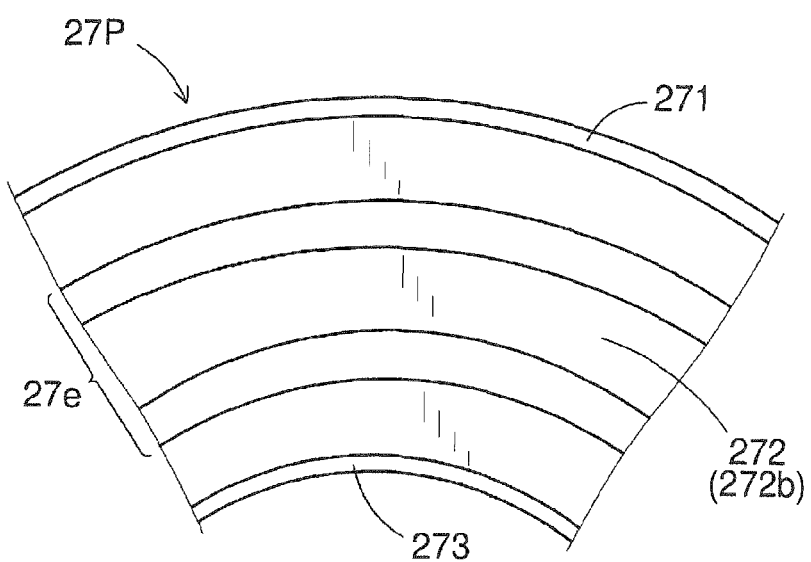
FIG. 31 is a partial illustration, as viewed from an arrow XXXI in FIG. 30.

The connector 272 is, as illustrated in FIG. 31, made of a single annular plate with an undulating or waved portion 27e defined by a combination of a protrusion(s) and a groove(s). In other words, the annular plate is waved to form an annular protrusion(s) or an annular groove(s) as reinforcements to enhance the stiffness of the connector 272. The configuration (e.g., shape, number, width, or height) of the waved portion 27e may be determined depending upon a required degree of stiffness of the connector 272. The waved portion 27e also work as a fin heat sink to dissipate thermal energy transferred from the outer stator 14 or the inner stator 17 when the electric rotating machine 10 is being electrically energized.

Sixteenth Embodiment

The electric rotating machine 10 of the sixteenth embodiment will be described with reference to FIG. 32. Unless otherwise specified, the same reference numbers as employed in the first to fifteenth embodiments will refer to the same parts, and explanation thereof in detail will be omitted here.

The electric rotating machine 10 includes the retainer 27Q that is one example of the retainer 27. The retainer 27Q is equipped with the outer retainer 271, the connector 272, the inner retainer 273, the outer bend 276o, the inner bend 276i, the outer locking portions 27ao, the inner locking portions 27ai, the outer hooks 27co, and the inner hooks 27ci.

The retainer 27Q is substantially identical in structure with the retainer 27M in FIG. 26 except the connector 272. The connector 272 is made of an annular plate which has at least one rib 27f to enhance the stiffness of the connector 272. The rib 27f is made of, for example, a strip glued to or formed integrally with the connector 272. In the case where the connector 272 is equipped with a plurality of ribs 27f, the ribs 27f may extend radially and be arrayed away from each other in the circumferential direction of the connector 272 over the whole of the surface of the connector 272. The thickness of the rib 27f may be determined depending upon a required degree of stiffness of the connector 272. The outer bend 276o, the inner bend 276i, the outer locking portions 27ao, the inner locking portions 27ai, the outer hooks 27co, and/or the inner hooks 27ci may be omitted as needed.

Seventeenth Embodiment

The electric rotating machine 10 of the seventeenth embodiment will be described with reference to FIGS. 33 and 34. Unless otherwise specified, the same reference numbers as employed in the first to sixteenth embodiments will refer to the same parts, and explanation thereof in detail will be omitted here.

The electric rotating machine 10 includes the retainer 27R that is one example of the retainer 27. The retainer 27R is equipped with the outer retainer 271, the connector 272, the inner retainer 273, the outer bend 276o, the inner bend 276i, the outer locking portions 27ao, the inner locking portions 27ai, the outer hooks 27co, and the inner hooks 27ci.

The retainer 27R is substantially identical in structure with the retainer 27M in FIG. 26 except the connector 272. The connector 272 is made of an annular plate which has at least one waved portion 27*e* and at least one attachment flange 27*g*. The waved portion 27*e* is identical with that in FIGS. 30 and 31.

Figure 33:
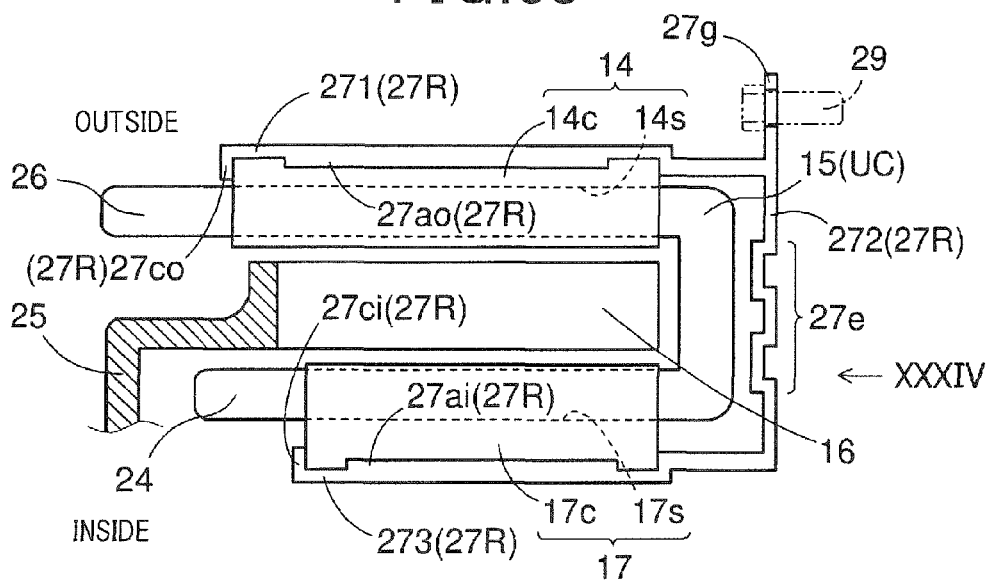
FIG. 33 is a partially schematic side view of a retainer of an electric rotating machine according to the seventeenth embodiment.
Figure 34:
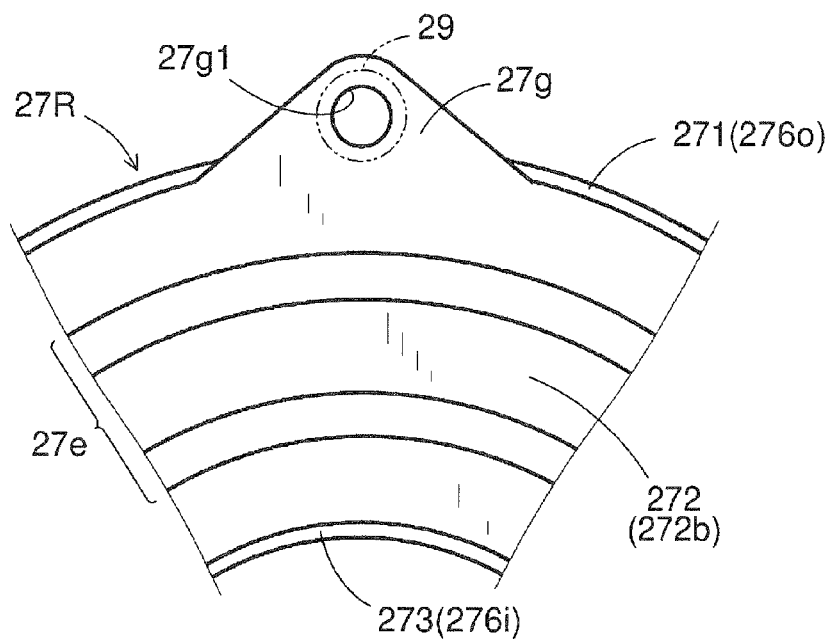
FIG. 34 is a partial illustration, as viewed from an arrow XXXIV in FIG. 33.

The attachment flange 27*g* extends from the end of the hollow cylindrical outer retainer 271 in the radial direction of the outer retainer 271 (i.e., the upward direction, as viewed in FIGS. 33 and 34). The attachment flange 27*g* may alternatively be designed to extend in another direction other than the radial direction of the outer retainer 271 depending upon the structure of the housing 11. In the case where the outer retainer 271 is equipped with a plurality of attachment flanges 27*b*, they may be disposed away from each other on the edge of the outer retainer 271.

The attachment flange 27*g* has formed therein a hole 27*g*1 through which a fastener 29, as indicated by a broken line, such as a bolt passes to make a mechanical joint between the attachment flange 27*b* and the inner wall of the housing 11, thereby attaching the outer stator 14 and the inner stator 17 to the housing 11.

The attachment flange 27*g* may alternatively be formed on the inner retainer 273. The waved portion 27*e*, the outer bend 276*o*, the inner bend 276*i*, the outer locking portions 27*ao*, the inner locking portions 27*ai*, the outer hooks 27*co*, and/or the inner hooks 27*ci* may be omitted as needed.

Eighteenth Embodiment

The electric rotating machine 10 of the eighteenth embodiment will be described with reference to FIGS. 35 and 36. Unless otherwise specified, the same reference numbers as employed in the first to seventeenth embodiments will refer to the same parts, and explanation thereof in detail will be omitted here. FIG. 36 omits the inner multi-phase winding 24 and the outer multi-phase winding 26 for the brevity of illustration.

The electric rotating machine 10 includes the retainer 27S that is one example of the retainer 27. The retainer 27S is equipped with the outer retainer 271, the connector 272, the inner retainer 273, the outer bend 276*o*, the inner bend 276*i*, the outer locking portions 27*ao*, the inner locking portions 27*ai*, the outer hooks 27*co*, and the inner hooks 27*ci*.

The retainer 27S is substantially identical in structure with the retainer 27M in FIG. 26 except the connector 272. The connector 272 is made of an annular plate which has at least one waved portion 27*e* and at least one attachment flange 27*h*. The waved portion 27*e* is identical with that in FIGS. 30 and 31. The retainer 27S is viewed as a modification of the retainer 27R of FIG. 33.

Figure 35:
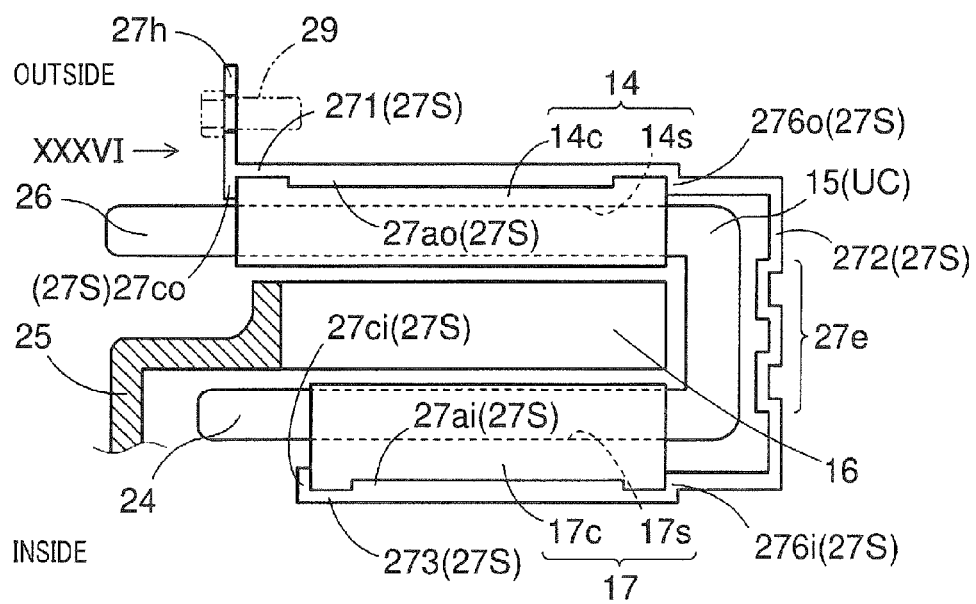
FIG. 35 is a partially schematic side view of a retainer of an electric rotating machine according to the eighteenth embodiment.
Figure 36:
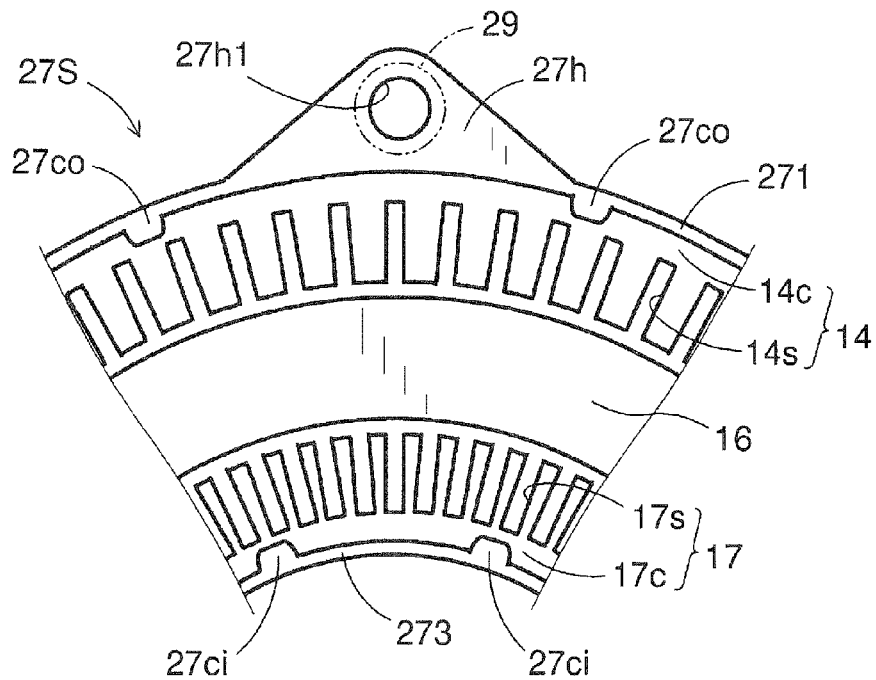
FIG. 36 is a partial illustration, as viewed from an arrow) XXXVI in FIG. 35.

The attachment flange 27*h* extends from one of opposed ends (i.e., the left end, as viewed in FIG. 35, farther away from the connector 272) of the hollow cylindrical outer retainer 271 in the radial direction of the outer retainer 271 (i.e., the upward direction, as viewed in FIGS. 35 and 36). In other words, the attachment flange 27*h* extends in a direction opposite a direction in which the outer hooks 27*co* extend from the end of the outer retainer 271. The attachment flange 27*h* may alternatively be designed to extend in another direction other than the radial direction of the outer retainer 271 depending upon the structure of the housing 11. In the case where the outer retainer 271 is equipped with a plurality of attachment flanges 27*h*, they may be disposed away from each other on the edge of the outer retainer 271.

The attachment flange 27*h* has formed therein the hole 27*h*1 through which the fastener 29, as indicated by a broken line, such as a bolt passes to make a mechanical joint between the attachment flange 27*h* and the inner wall of the housing 11, thereby attaching the outer stator 14 and the inner stator 17 to the housing 11.

The attachment flange 27*h* may alternatively be formed on the inner retainer 273. The waved portion 27*e*, the outer bend 276*o*, the inner bend 276*i*, the outer locking portions 27*ao*, the inner locking portions 27*ai*, the outer hooks 27*co*, and/or the inner hooks 27*ci* may be omitted as needed.

Nineteenth Embodiment

The electric rotating machine 10 of the nineteenth embodiment will be described with reference to FIGS. 37 and 38. Unless otherwise specified, the same reference numbers as employed in the first to eighteenth embodiments will refer to the same parts, and explanation thereof in detail will be omitted here. FIG. 38 omits the inner multi-phase winding 24 and the outer multi-phase winding 26 for the brevity of illustration.

The electric rotating machine 10 includes the retainer 27T that is one example of the retainer 27. The retainer 27T is equipped with the outer retainer 271, the connector 272, the inner retainer 273, the outer bend 276*o*, the inner bend 276*i*, the outer locking portions 27*ao*, the inner locking portions 27*ai*, the outer hooks 27*do*, and the inner hooks 27*di*.

Figure 28:
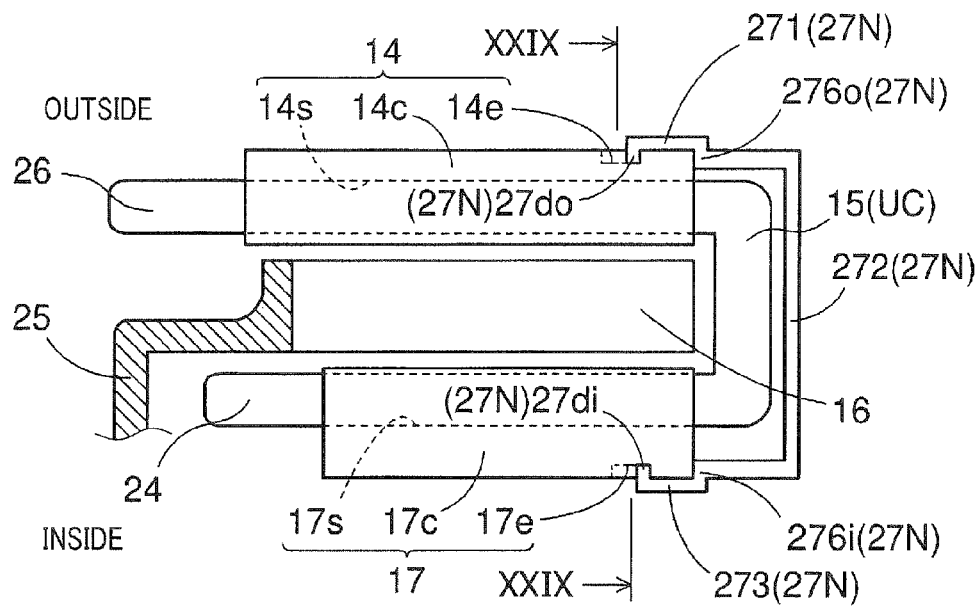
FIG. 28 is a partially schematic side view of a retainer of an electric rotating machine according to the fourteenth embodiment.
Figure 29:
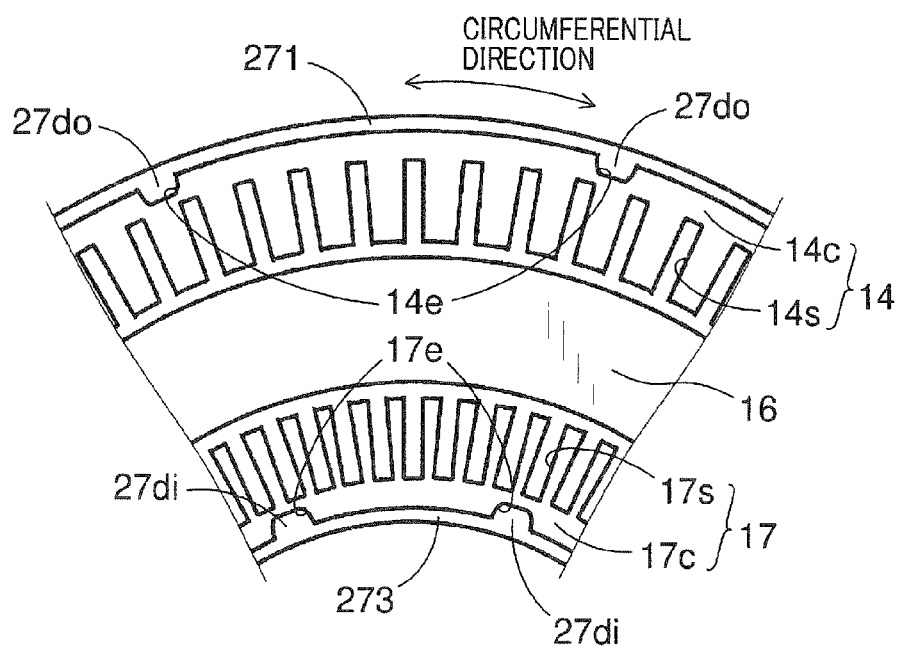
FIG. 29 is a partial transverse sectional view, as taken along the line XXIX-XXIX in FIG. 28.

The retainer 27T is basically identical in structure with the retainer 27N in FIGS. 28 and 29, but includes at least one attachment flange 27*i*. The retainer 27T is viewed as a modification of the retainer 27R of FIG. 33.

Figure 37:
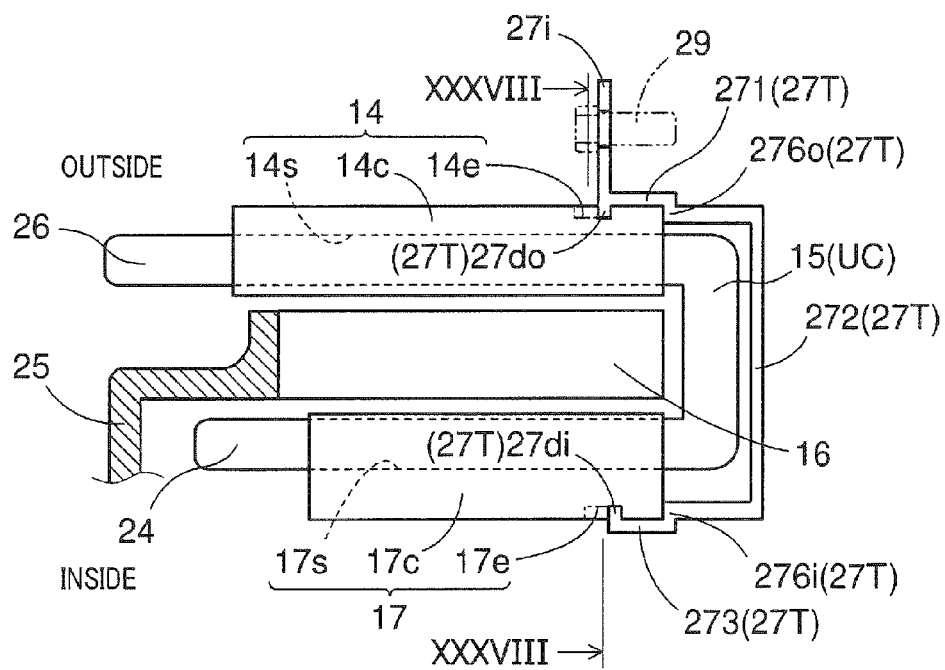
FIG. 37 is a partially schematic side view of a retainer of an electric rotating machine according to the nineteenth embodiment.
Figure 38:
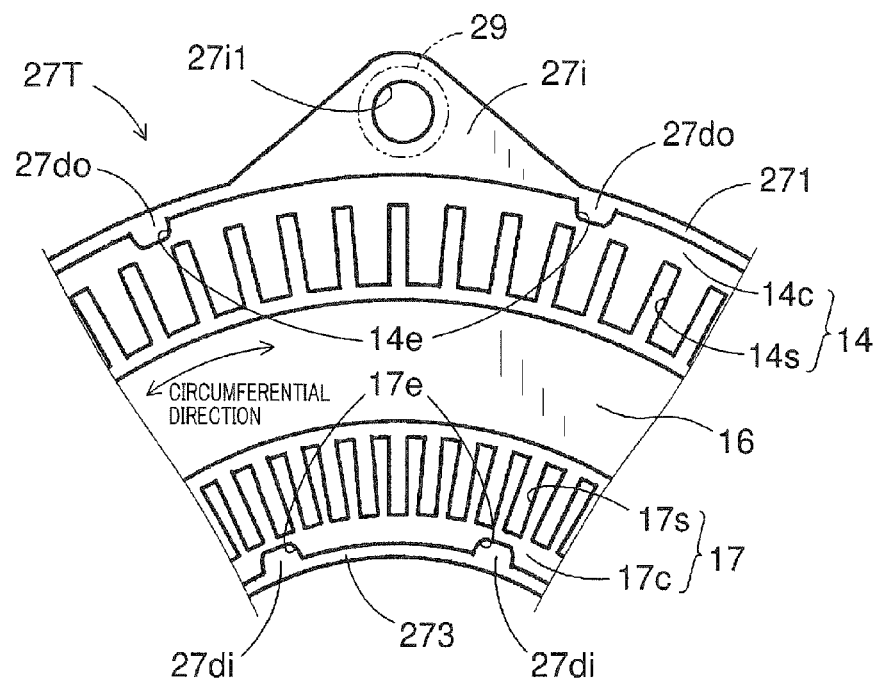
FIG. 38 is a partial transverse sectional view, as taken along the line XXVIII-XXVIII in FIG. 37.

The attachment flange 27*i* extends from one of opposed ends (i.e., the left end, as viewed in FIG. 37, farther away from the connector 272) of the hollow cylindrical outer retainer 271 in the radial direction of the outer retainer 271 (i.e., the upward direction, as viewed in FIGS. 37 and 3). In other words, the attachment flange 27*i* extends in a direction opposite a direction in which the outer hooks 27*do* extend from the end of the outer retainer 271. The attachment flange 27*i* may alternatively be designed to extend in another direction other than the radial direction of the outer retainer 271 depending upon the structure of the housing 11. In the case where the outer retainer 271 is equipped with a plurality of attachment flanges 27*i*, they may be disposed away from each other on the edge of the outer retainer 271.

The attachment flange 27*i* has formed therein the hole 27*i*1 through which the fastener 29, as indicated by a broken line, such as a bolt passes to make a mechanical joint between the attachment flange 27*i* (i.e., the retainer 27T) and the inner wall of the housing 11, thereby attaching the outer stator 14 and the inner stator 17 to the housing 11.

The attachment flange 27*i* may alternatively be formed on the inner retainer 273. The outer bend 276*o*, the inner bend 276*i*, the outer locking portions 27*ao*, the inner locking portions 27*ai*, the outer hooks 27*co*, and/or the inner hooks 27*ci* may be omitted as needed.

Twentieth Embodiment

The electric rotating machine 10 of the twentieth embodiment will be described with reference to FIG. 39. Unless otherwise specified, the same reference numbers as employed in the first to nineteenth embodiments will refer to the same parts, and explanation thereof in detail will be omitted here.

The electric rotating machine 10 includes the retainer 27K that is one example of the retainer 27. The retainer 27K is basically identical in structure with that in the eleventh embodiment in FIGS. 22 and 23. The retainer 27K in this embodiment also includes an electric insulator 28 disposed between the connector 272 and the connectors 15. The insulator 28 is basically made of an electrically insulating material, but may be made of material which also has a high thermal conductivity. In this case the insulator 28 also serves as a heat dissipator to release heat, as produced by the connectors 15 and transferred to the connector 272 when the electric rotating machine 10 is being energized.

Figure 16:
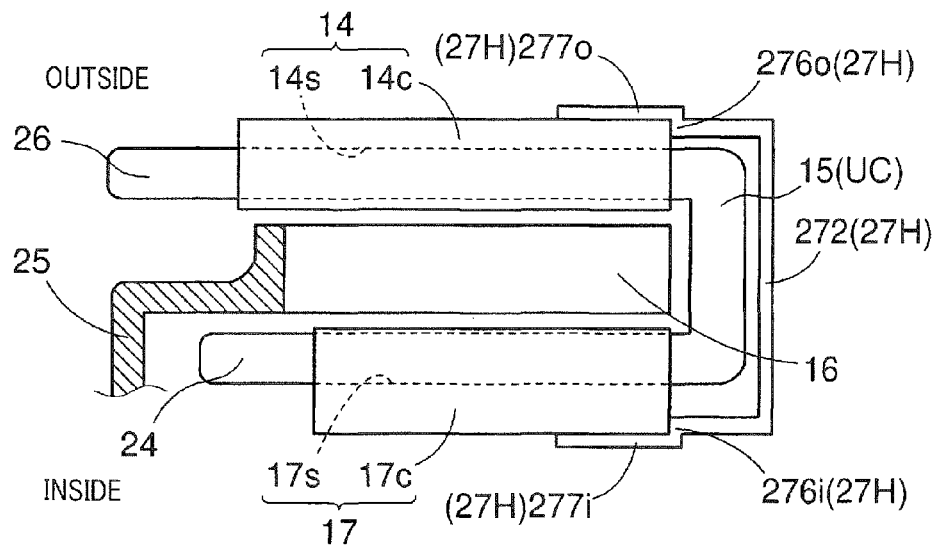
FIG. 16 is a partially schematic side view of a retainer of an electric rotating machine according to the eighth embodiment.
Figure 17:
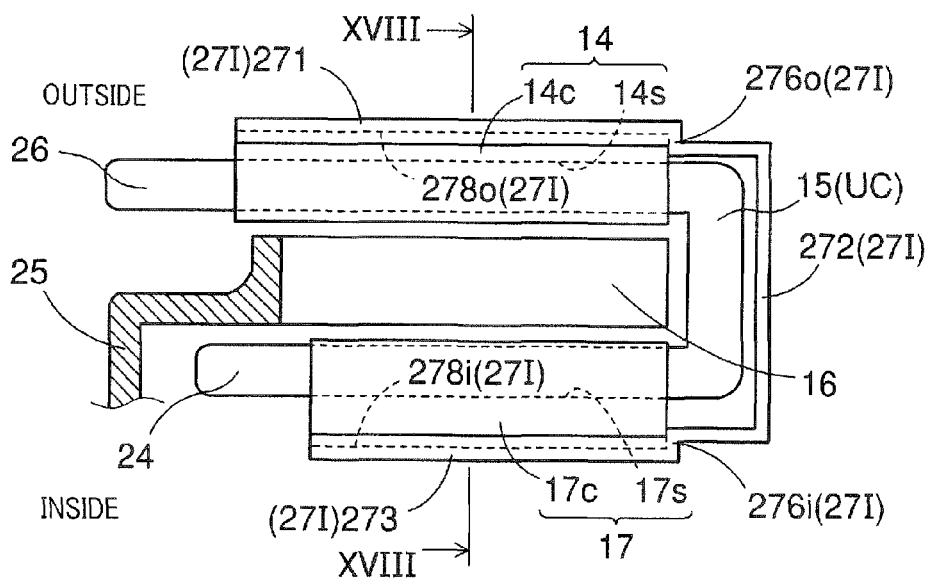
FIG. 17 is a partially schematic side view of a retainer of an electric rotating machine according to the ninth embodiment.
Figure 20:
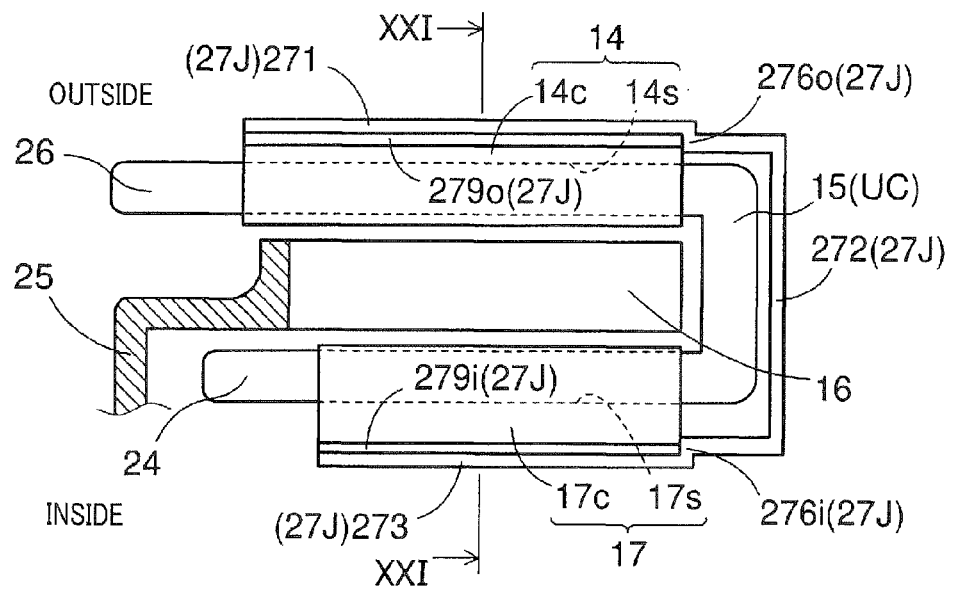
FIG. 20 is a partially schematic side view of a retainer of an electric rotating machine according to the tenth embodiment.
Figure 21:
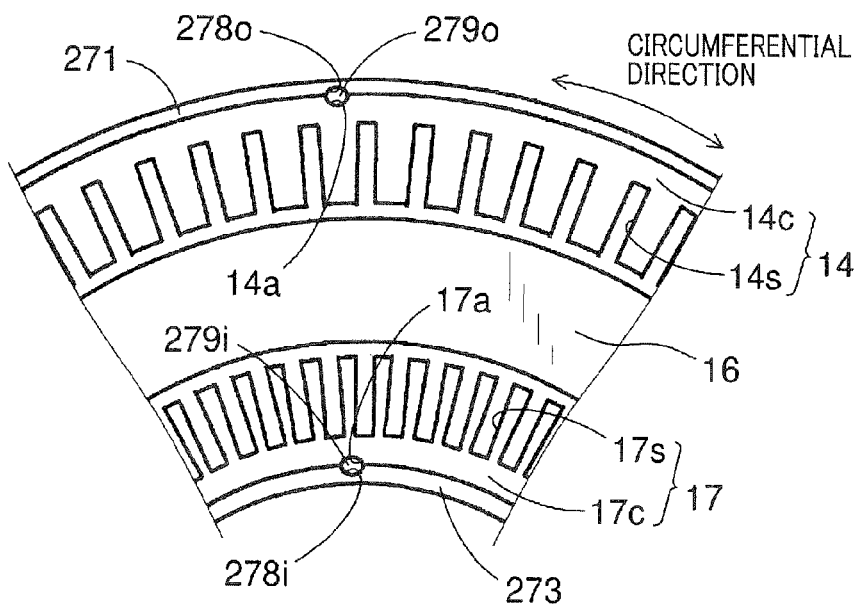
FIG. 21 is a partial transverse sectional view, as taken along the line XXI-XXI in FIG. 20.
Figure 22:
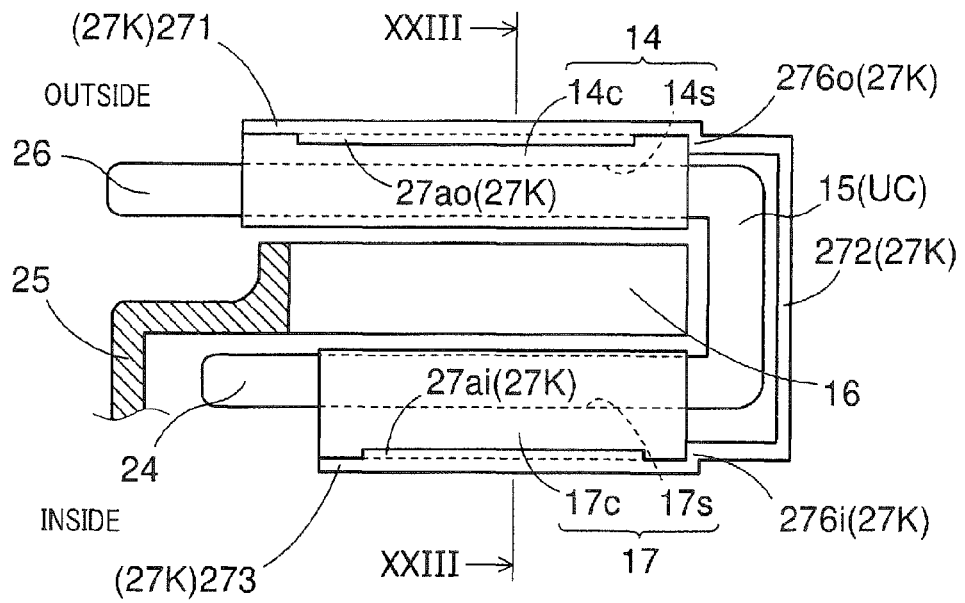
FIG. 22 is a partially schematic side view of a retainer of an electric rotating machine according to the eleventh embodiment.
Figure 23:
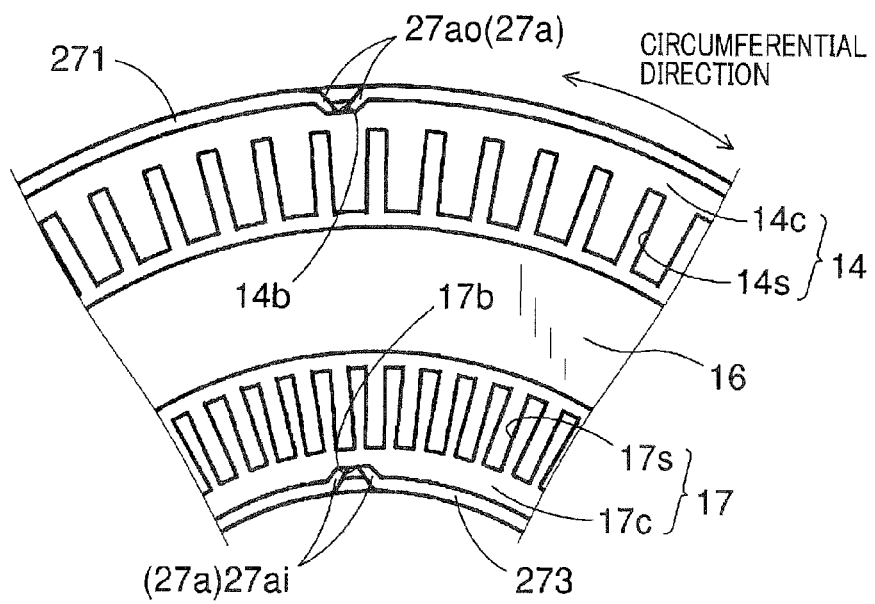
FIG. 23 is a partial transverse sectional view, as taken along the line XXII-XXII in FIG. 22.
Figure 24:
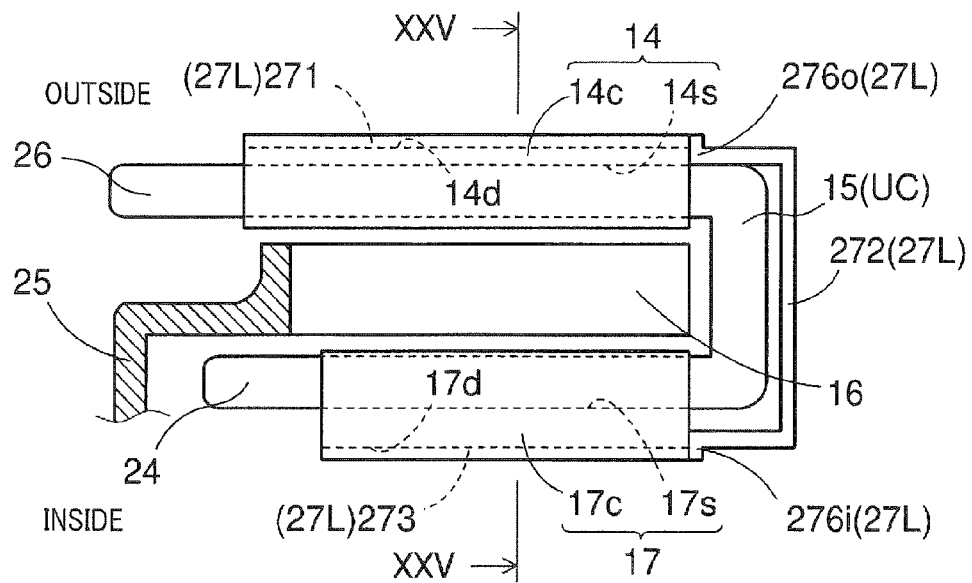
FIG. 24 is a partially schematic side view of a retainer of an electric rotating machine according to the twelfth embodiment.
Figure 25:
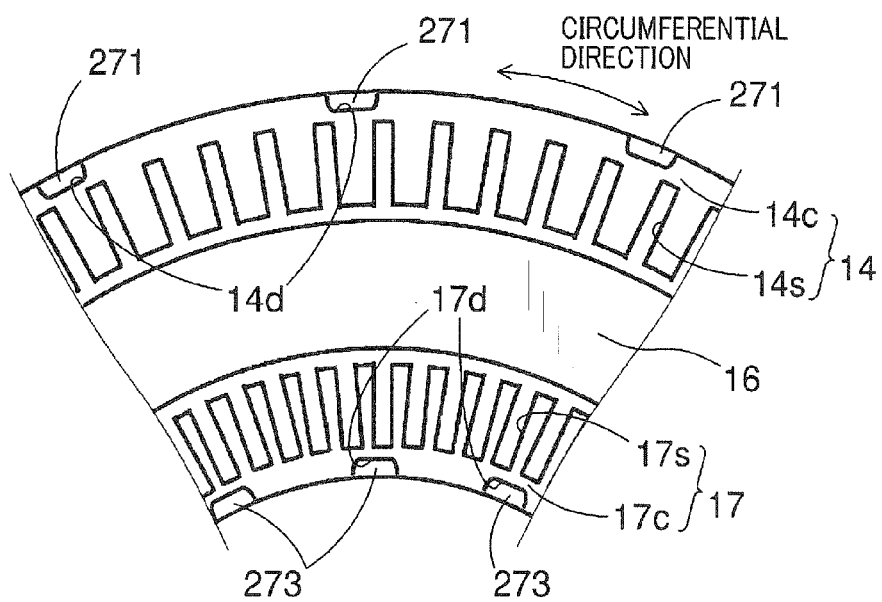
FIG. 25 is a partial transverse sectional view, as taken along the line XXV-XXV in FIG. 24.
Figure 30:
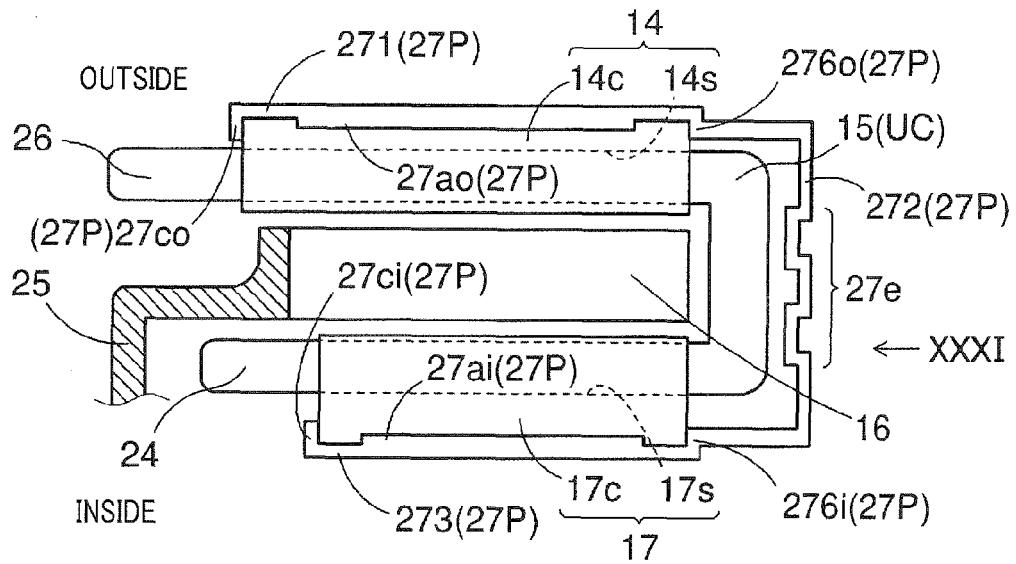
FIG. 30 is a partially schematic side view of a retainer of an electric rotating machine according to the fifteenth embodiment.
Figure 32:
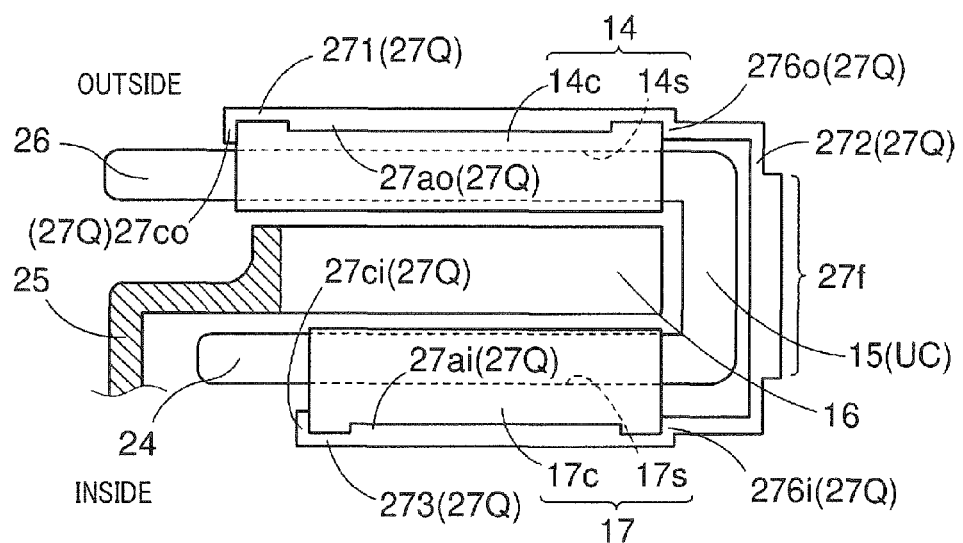
FIG. 32 is a partially schematic side view of a retainer of an electric rotating machine according to the sixteenth embodiment.
Figure 40:
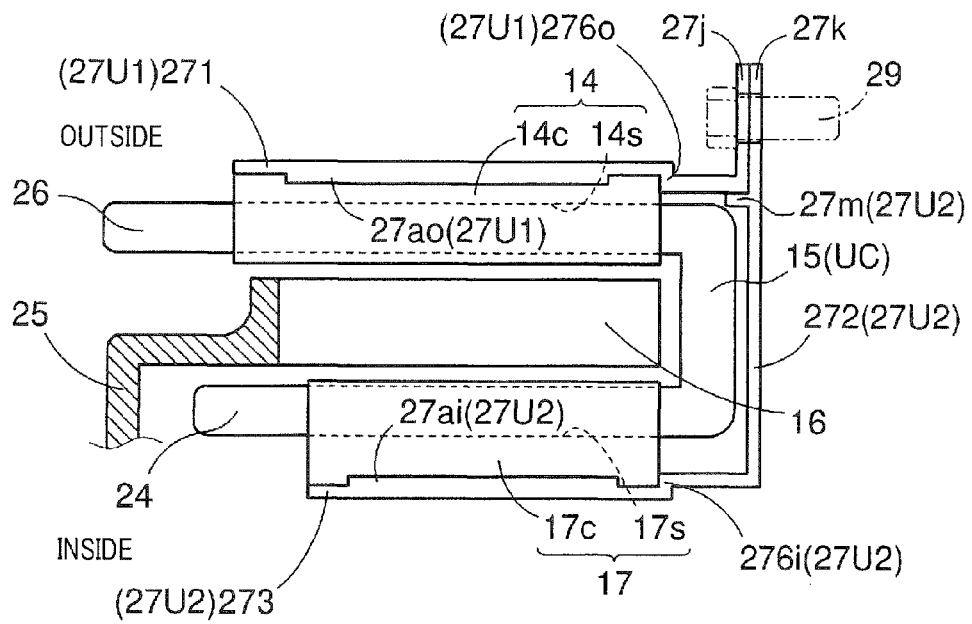
FIG. 40 is a partially schematic side view of a retainer of an electric rotating machine according to the twenty-first embodiment.
Figure 41:
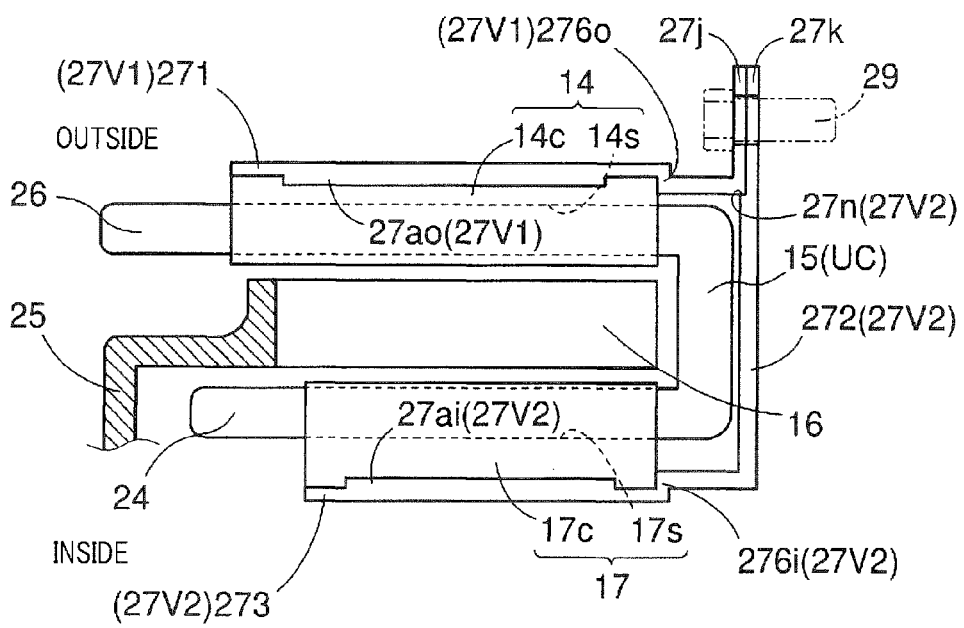
FIG. 41 is a partially schematic side view of a retainer of an electric rotating machine according to the twenty-second embodiment.

The insulator 28 may be used with the structure of the fourth embodiment of FIG. 8, the fifth embodiment of FIG. 10, the sixth embodiment of FIG. 12, the eighth embodiment of FIG. 16, the ninth embodiment of FIG. 17, the tenth embodiment of FIG. 20, the eleventh embodiment of FIG. 22, the twelfth embodiment of FIG. 24, the thirteenth embodiment of FIG. 26, the fifteenth embodiment of FIG. 30, the sixteenth embodiment of FIG. 32, the seventeenth embodiment of FIG. 33, the eighteenth embodiment of FIG. 35, the nineteenth embodiment of FIG. 37, the twenty-first embodiment of FIG. 40 which will be described later in detail, or the twenty-second embodiment of FIG. 41 which will be described later in detail. In any of the structures, the insulator 28 is preferably disposed between the connector 272 and the connectors 15.

The electric rotating machine 10 of this embodiment may alternatively be designed to have the retainer 27M in FIGS. 26 and 27 instead of the retainer 27K.

Twenty-First Embodiment

The electric rotating machine 10 of the twenty-first embodiment will be described with reference to FIG. 40. Unless otherwise specified, the same reference numbers as employed in the first to twentieth embodiments will refer to the same parts, and explanation thereof in detail will be omitted here.

The electric rotating machine 10 includes an assembly of an outer retainer 27U1 and an inner retainer 27U2 which is one example of the retainer 27. In other words, the retainer 27 of this embodiment is implemented by a combination of two retainers: the retainers 27U1 and 27U2 which retain the outer stator 14 and the inner stator 17, respectively. The retainer 27 of this embodiment may be made up of three or more retainers.

The retainer 27U1 is equipped with the outer retainer 271, the outer bend 276o, the outer locking portions 27ao, and the attachment flange 27j. The outer retainer 271 and the attachment flange 27j are joined or formed integrally to have an L-shaped cross section. The L-shaped cross section has a corner positioned or supported by a protrusion 27m of the retainer 27U2, as will be described later.

The retainer 27U2 includes the connector 272, the inner retainer 273, the inner bend 276i, the inner locking portions 27ai, the attachment flange 27k, and the protrusion 27m. The attachment flange 27k extends vertically, as viewed in FIG. 40, in other words, outward in the radial direction of the outer rotor 14 from the connector 272. The protrusion 27m lies at a boundary between the connector 272 and the attachment flange 27k and extends parallel to the axial direction of the outer stator 14 (i.e., the horizontal direction, as viewed in FIG. 40).

The attachment flanges 27j and 27k have formed therein holes which coincide with each other to define the hole 27h1 in FIG. 36 through which the fastener 29, as indicated by a broken line, such as a bolt passes to make a mechanical joint between the attachment flanges 27j and 27k (i.e., the retainers 27U1 and 27U2) and the inner wall of the housing 11, thereby attaching the outer stator 14 and the inner stator 17 to the housing 11.

The attachment flange 27j may alternatively be formed on the inner retainer 273. In this case, the attachment flange 27k is formed to extend downward, as viewed in FIG. 40, from the connector 272 of the retainer U2. The outer bend 276o, the inner bend 276i, the outer locking portions 27ao, and/or the inner locking portions 27ai may be omitted as needed.

Twenty-Second Embodiment

The electric rotating machine 10 of the twenty-second embodiment will be described with reference to FIG. 41. Unless otherwise specified, the same reference numbers as employed in the first to twenty-first embodiments will refer to the same parts, and explanation thereof in detail will be omitted here.

The electric rotating machine 10 includes an assembly of an outer retainer 27V1 and an inner retainer 27V2 which is one example of the retainer 27. In other words, the retainer 27 of this embodiment is implemented by a combination of two retainers: the retainers 27V1 and 27V2 which serves to retain the outer stator 14 and the inner stator 17 together. The retainer 27 of this embodiment may be made up of three or more retainers.

The retainer 27V1 is, like the retainer 27U1, equipped with the outer retainer 271, the outer bend 276o, the outer locking portions 27ao, and the attachment flange 27j. The outer retainer 271 and the attachment flange 27j are joined or formed integrally to have an L-shaped cross section. The L-shaped cross section has a corner positioned or supported by an inner shoulder 27n of the retainer 27V2, as will be described later.

The retainer 27V2 includes the connector 272, the inner retainer 273, the inner bend 276i, the inner locking portions 27ai, the attachment flange 27k, and the inner shoulder 27n. The retainer 27V2 is different from the retainer 27U2 only in that the shoulder 27n is formed at a boundary of the connector 272 and the attachment flange 27k. The inner shoulder 27n extends parallel to the axial direction of the outer stator 14 (i.e., the horizontal direction, as viewed in FIG. 41).

The attachment flanges 27j and 27k, like in the twenty-first embodiment, have formed therein holes which coincide with each other to define the hole 27h1 in FIG. 36 through which the fastener 29, as indicated by a broken line, such as a bolt passes to make a mechanical joint between the attachment flanges 27j and 27k (i.e., the retainers 27V1 and 27V2) and the inner wall of the housing 11, thereby attaching the outer stator 14 and the inner stator 17 to the housing 11.

Twenty-Third Embodiment

The electric rotating machine 10 of the twenty-third embodiment will be described with reference to FIG. 42. Unless otherwise specified, the same reference numbers as employed in the first to twenty-second embodiments will refer to the same parts, and explanation thereof in detail will be omitted here.

The electric rotating machine 10 includes an assembly of an outer retainer 27W1 and an inner retainer 27W2 which is one example of the retainer 27. In other words, the retainer 27 of this embodiment is implemented by a combination of two retainers: the retainers 27W1 and 27W2 which is modification of the assembly of the retainers 27U1 and 27U2 of FIG. 40 and serves to retain the outer stator 14 and the inner stator 17 together. The retainer 27 of this embodiment may be made up of three or more retainers.

The retainer 27W1 is equipped with the outer hooks 27co, the outer retainer 271, the outer bend 276o, the connector 272, the inner bend 276i and the inner retainer 273. The outer retainer 271 is shaped to cover the whole of the outer peripheral surface of the outer stator 14 in the axial direction of the outer stator 14. The inner retainer 273 is shaped to cover a portion of the inner peripheral surface of the inner stator 17 in the axial direction of the inner stator 17. The assembly of the retainers 27W1 and 27W2 has an end structure identical with the one in FIG. 27, as viewed from the arrow XXVII.

The retainer 27W2 includes the inner hooks 27*ci*, the inner retainer 273, and the locking portions 27*p*. The inner hooks 27*ci* are fit on the end of the inner stator 17, while the locking portions 27*p* are fit on the inner bend 276*i*, thereby joining the retainers 27W1 and 27W2 together to retain the outer stator 14 and the inner stator 17 together.

The retainer 27W1 may be equipped with the attachment flange 27*j* in FIG. 40. The inner retainer 273 of the retainer 27W2 faces the inner peripheral surface of the inner rotor 17 through an air gap, but it may be placed in direct contact with the inner peripheral surface of the inner rotor 17.

Other Modifications

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

Figure 43:
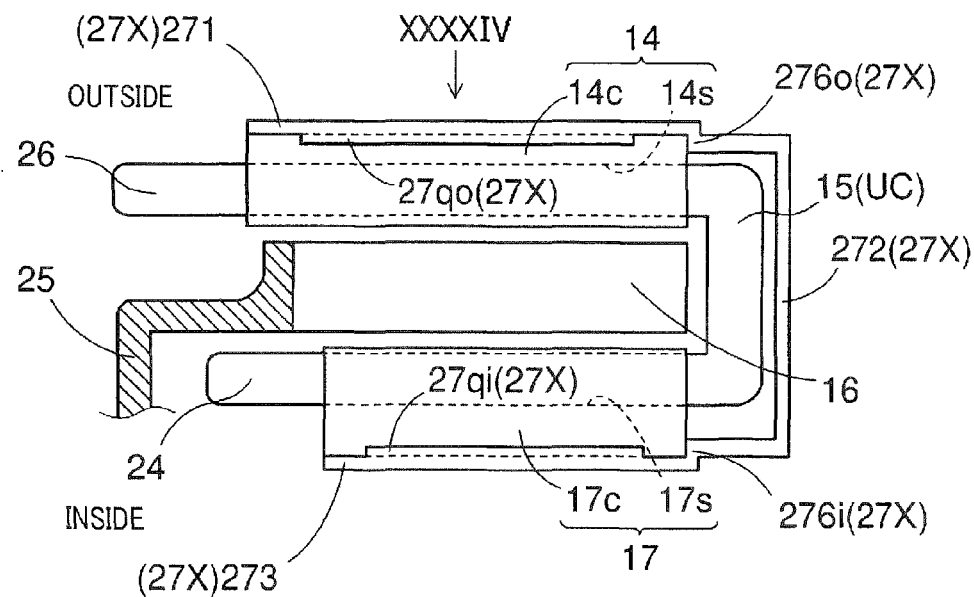
FIG. 43 is a partially schematic side view of a retainer of an electric rotating machine in a modified form.
Figure 44:
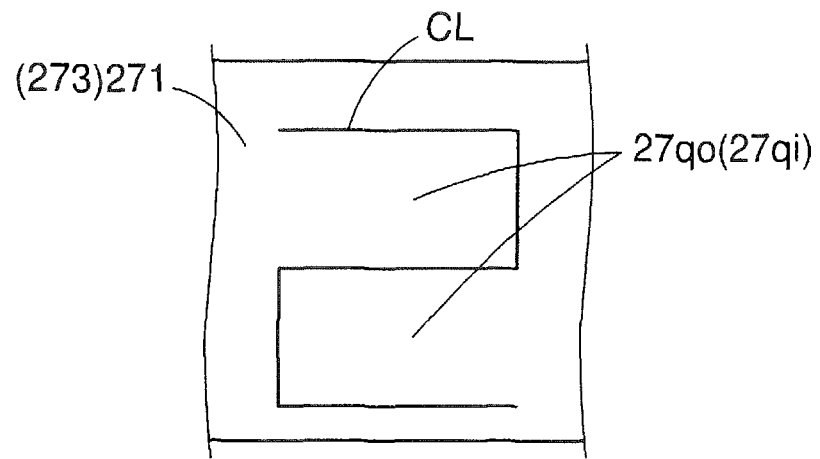
FIG. 44 is a partial plane illustration, as viewed from an arrow XXXXIV in FIG. 43.
Figure 45:
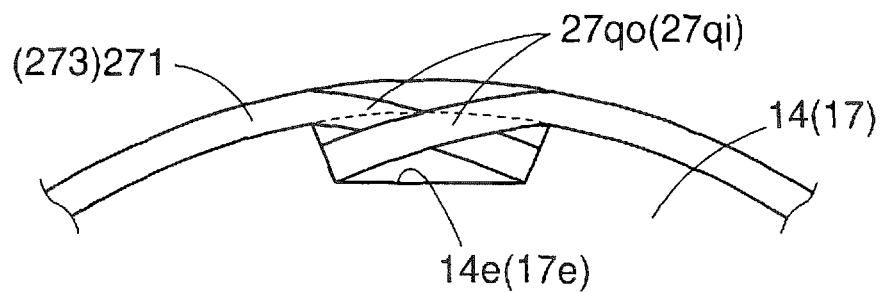
FIG. 45 is a partial transverse sectional view of FIG. 44.

The retainer 27K in the eleventh embodiment of FIGS. 22 and 23 is, as described above, designed to have the outer looking portion 27*ao* fit in the locked portion 14*b* and the inner locking portion 27*ai* fit in the locked portion 17*b*. Specifically, the joint of the outer retainer 27 and the outer stator 14 is achieved by bending a portion(s) of the outer retainer 271 inwardly to form the outer locking portion 27*ao* and placing it in contact with the inner wall of the locked portion 14*b* and also by bending a portion(s) of the inner retainer 273 outwardly to form the inner locking portion 27*ai* and placing it in contact with the inner wall of the locked portion 17*b*, however, that joint may alternatively be accomplished by bending a portion(s) of the outer retainer 271 inwardly and placing it to have an end thereof in contact with the inner wall of the locked portion 14*b* and also bending a portion(s) of the inner retainer 273 outwardly and placing it to have an end thereof in contact with the inner wall of the locked portion 17*b*. FIGS. 43 to 45 illustrate an example of such a modification.

The electric rotating machine 10 of FIG. 43 includes a retainer 27X that is one example of the retainer 27. The retainer 27X includes the outer retainer 271, the connector 272, the inner retainer 273, the outer bend 276*o*, the inner bend 276*i*, and a pair of outer locking portions 27*qo*, a pair of inner locking portions 27*qi*. The outer locking portions 27*qo* are, as illustrated in FIG. 44, made by cutting the outer retainer 271 along the line CL to form two rectangular strips and bending them inwardly. The inner locking portions 2727*qi* are made in the same way. The outer retainer 271 may be designed to have a plurality of pairs of the outer locking portions 27*qo* which are arranged away from each other in the circumferential direction of the outer retainer 271. Similarly, the inner retainer 273 may also be designed to have a plurality of pairs of the inner locking portions 27*qi* which are arranged away from each other in the circumferential direction of the inner retainer 273.

The outer locking portions 27*qo* are, as can be seen in FIG. 45, bent inwardly from the major portion of the outer retainer 271 to have ends thereof placed in contact with the inner side wall of the locked portion 14*e* formed in the outer peripheral surface of the outer retainer 271 in the shape of a recess, thereby making a mechanical joint between the outer retainer 271 and the outer stator 14. The inner locking portions 27*qi* are bent outwardly from the major portion of the inner retainer 273 to have ends thereof placed in contact with the inner side wall of the locked portion 17*e* formed in the inner peripheral surface of the inner retainer 273 in the shape of a recess, thereby making a mechanical joint between the inner retainer 273 and the inner stator 17. This avoids an undesirable displacement of the retainer 27X in the circumferential direction thereof.

The electric rotating machine 10 has been described as the double-stator motor generator, but however, may alternatively engineered as a double-stator electric generator or a double-stator electric motor depending upon the intended use. The double-stator electric generator or the double-stator electric motor is different only in function from the double-stator motor generator and thus offers the same beneficial effects as described in the first to twenty-third embodiments.

The retainer 27 has been described as being implemented by any of the retainers 27A to 27X in the first to twenty-third embodiments illustrated in FIGS. 1 to 42, but however, may alternatively be made by a combination of two or more features of the retainers 27A to 27X. For example, the structure of the connector(s) 272 illustrated in FIG. 4, 5, 13, 14, or 31 may be used with all possible ones of the retainers 27A to 27X. The attachment flange 27*j* of the retainer 27U1 or the attachment flange 27*k* of the retainer 27U2 in the twenty-first embodiment may be used with any of the retainers 27A to 27V in the first to twentieth embodiments of FIGS. 2 to 39.

The electric rotating machine 10 in each of the first to twenty-third embodiment and the modifications, as described above, offer the following beneficial advantages.

(1) The electric rotating machine 10, as described above, includes the connector 272 which joints the outer stator 14 and the inner stator 17 together and the retainer 27 (i.e., one of the retainers 27A to 27X). The retainer 27 may be equipped with at least one of the outer and inner retainers 271 and 273 and is placed in contact with either or both of at least a portion of the outer peripheral surface of the outer stator 14 and at least a portion of the inner peripheral surface of the inner stator 17 (see FIGS. 1 to 45). Specifically, the connector 272 works to establish a mechanical joint between the outer stator 14 and the inner stator 17. The retainer 27 (i.e., the outer or inner retainer 271 or 273) serves to hold or retain either or both of the outer periphery of the outer stator 14 and the inner periphery of the inner stator 17 together. This avoids an undesirable relative displacement of the outer stator 14 and the inner stator 17 in the circumferential and axial directions thereof.

(2) The outer periphery of the outer stator 14 is equipped with at least one locked portion 14*a*, 14*b*, 14*d*, or 14*e*. Similarly or alternatively, the inner periphery of the inner stator 17 is equipped with at least one locked portion 17*a*, 17*b*, 17*d*, or 17*e*. The retainer 271 and/or the retainer 273 is equipped with at least one locking portion 275*i*, 275*o*, 278*i*, 278*o*, 27*ai*, 27*ao*, 27*di*, or 27*do* which is fit in or engages the locked portion 14*a*, 14*b*, 14*d*, or 14*e* (FIG. 10, 11, 17, 18, 19, 22, 23, 27, or 28), thereby holding the outer and inner stators 14 and 17 from being shifted in the circumferential direction, the axial direction, or the radial direction thereof.

(3) The locked portion 14*a* 14*b*, 14*d*, 14*e*, 17*a*, 17*b*, 17*d*, or 17*e* is located in the reference angular position (e.g., an electric angle of 0 deg.) of the electric rotating machine 10 (see FIG. 18, 19, 21, or 23). The joint of the locked portion 14*a* 14*b*, 14*d*, 14*e*, 17*a*, 17*b*, 17*d*, or 17*e* with the locking portion, thus, enables each of the retainers 27A to 27X to be mounted in a desired orientation.

(4) The retainer 27 (i.e., at least one of the retainers 271 and 273) is designed to hold a corner of at least one of axially opposed ends of the outer periphery of the outer retainer 14 or the inner periphery of the inner retainer 17 (see FIGS. 12, 15-17, 20, 22, 26, 28, 30, 33, 35, 37, 39-41, and 43). This avoids the displacement of the stator 14 or 17 in the axial and radial directions thereof.

(5) The retainer 27 (i.e., at least one of the retainers 271 and 273) includes a hollow cylindrical portion which is placed in contact with at least one of the outer peripheral surface of the outer stator 14 and the inner peripheral surface of the inner stator 17 (see FIGS. 2 and 3), thereby resulting in an increased area of contact between the retainer 27 (i.e., the retainer 271 and/or 273) and at least one of the outer stator 14 and the inner stator 17 to ensure the stability in keeping the stator 14 or 17 from being displaced in the axial direction or the radial direction thereof. The hollow cylinder also enhances the stiffness of a corresponding one of the retainers 27A to 27X.

(6) The retainer 27 (i.e., at least one of the retainers 271 and 273) has at least one of axially opposed ends thereof which is farther away from the connector 272 and is bent to form the hook 27co, 27ci, 27do, or 27di which grabs at least one of the ends of the outer stator 14 and the inner stator 17 (see FIGS. 26 to 29), thereby ensuring the stability in holding the outer stator 14 or the inner stator 17 from being displaced in the axial and circumferential direction thereof.

(7) The retainer 27 (i.e., the retainer 27A) includes the connector(s) 272 which has, as clearly illustrated in FIG. 2, the thickness T2 greater than the thickness T1 of the retainer 27 (i.e., the outer retainer 271 and the inner retainer 273). Each of the retainers 27B to 27X may also be shaped to have the same dimensions. This enhances the stiffness of the connector 272 which is greater than that of the retainer 27 (i.e., the retainers 271 and 272), thus minimizing the bending or deflection of the retainer 27 (i.e., the retainers 27A to 27X) to avoid the misalignment thereof relative to the stators 14 and 17 in the axial and radial directions.

(8) The retainer 27 (i.e., the outer retainer 271) is shrinkage-fit (also called thermally fit) on the outer stator 14, thus establishing a tight mechanical joint therebetween to ensure the stability in holding the outer stator 14 from being displaced in the axial and circumferential directions thereof.

(9) The retainer 27 (i.e., the retainers 27A to 27X) is made of the same material or material containing the same component as that of the core of at least one of the outer stator 14 and the inner stator 17. In other words, the retainers 27A to 27X are substantially identical in linear coefficient of expansion with the core of the outer stator 14 or the inner stator 17, thus maintaining the power of holding the outer stator 14 or the inner stator 17 constant regardless of a change in ambient temperature to ensure the stability in holding the outer stator 14 or the inner stator 17 from being displaced in the axial and circumferential directions thereof.

Figure 39:
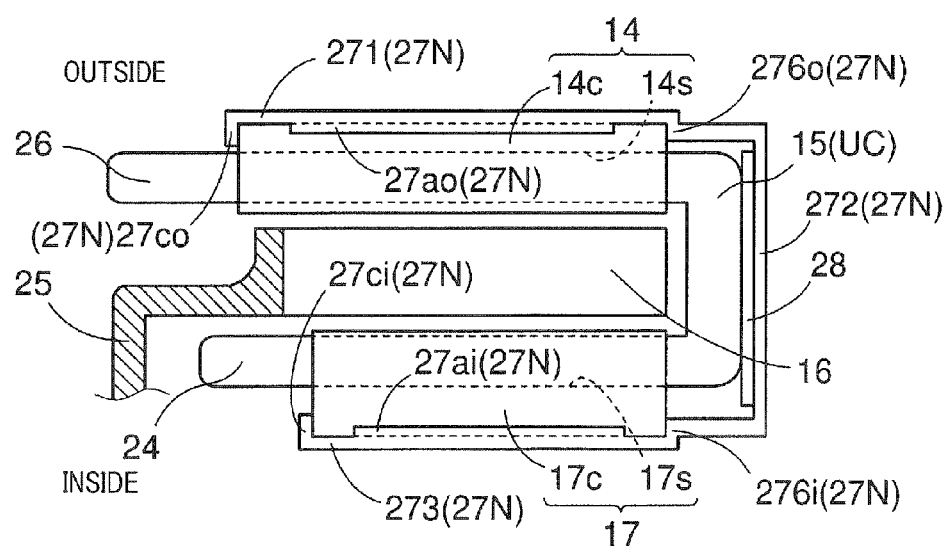
FIG. 39 is a partially schematic side view of a retainer of an electric rotating machine according to the twentieth embodiment.

(10) The insulator 28 is, as illustrated in FIG. 39, disposed between the connector 272 and at least one of the end of the outer multi-phase winding 26 and the end of the inner multi-phase winding 24, that is, between the connector 272 and the connector 15, thereby ensuring the electric isolation of the connector 15 (i.e., the outer multi-phase winding 26 or the inner multi-phase winding 24) from the connector 272 even when subjected to mechanical vibrations.

(11) In the case where the electric rotating machine 10 (i.e., the retainer 27) is equipped with a plurality of connectors 272, the connectors 272 are arranged at equal pitches or angular intervals θp away from each other (see FIGS. 4 and 13) in the circumferential direction of the retainer 27, thereby forming cooling paths through which coolant passes to cool the outer multi-phase winding 26 and the inner multi-phase winding 24 in addition to avoidance of misalignment between the outer stator core 14c and the inner stator core 17c.

(12) The connector 272 of the retainers 27P, 27R, and 27S has a waved portion 27e extending over or occupying a portion or the whole of the surface thereof (see FIGS. 30, 31, and 33 to 35). The waved portion 27e of each of the retainers 27A to 27N, 27Q, 27T, 27U, 27V, and 27X may be defined by a combination of a protrusion(s) and a recess(s), only a protrusion(s), or only a recess(es) formed on or in the surface of the connector 272. The waved portion 27e increases the stiffness of the connector 272 to avoid the bending or deflection of the retainers 27A to 27X.

(13) The retainer 27 (i.e., the retainer 27Q) of FIG. 32 has the connector 272 which is equipped with at least one rib 27f extending over or occupying a portion or the whole of a surface thereof. The retainers 27A to 27P and 27R to 27X may be equipped with the rib 27f. The rib 27f enhances the stiffness of the connector 272 to avoid the bending or deflection of the retainers 27A to 27X.

Figure 42:
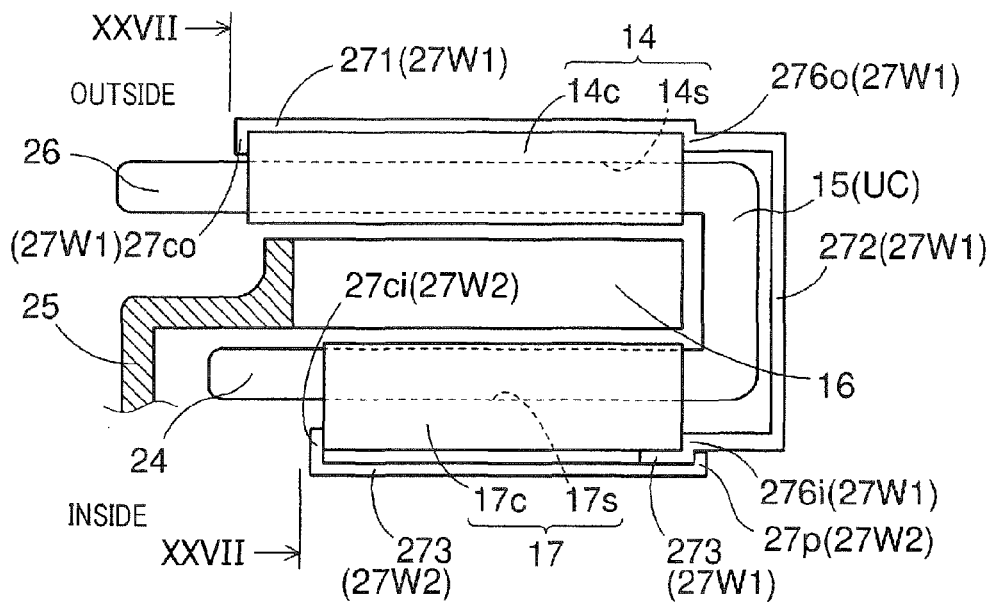
FIG. 42 is a partially schematic side view of a retainer of an electric rotating machine according to the twenty-third embodiment.

(14) The retainer 27 of FIGS. 40, 41, and 42 is made of an assembly of two discrete parts: the outer retainer 27U1, 27V1, 27W2 and the inner retainer 27U2, 27V1, or 27W3 to hold the outer rotor 14 and the inner rotor 17, respectively. This structure also works to minimize the displacement of the outer and inner rotors 14 and 17 in the axial and radial directions thereof.

(15) The retainer 27 (i.e., the retainers 27A to 27X) is made using a press, thus ensuring the accuracy of dimensions of the retainer 27 and permitting the retainer 27 to be produced at a low cost. The retainer 27 may alternatively be made by casing using, for example, sand molds or metallic molds, forging using, for example, an investment or mold, extrusion molding, or powder metallurgy.

What is claimed is:

1. A double-stator electric rotating machine comprising:
an outer stator which is equipped with an outer multi-phase winding;
an inner stator which is equipped with an inner multi-phase winding, the inner stator being disposed inside the outer stator;
a rotor which is disposed between the outer stator and the inner stator with gaps between itself and the outer stator and between itself and the inner stator; and
a retainer which includes a connector which joints between the outer stator and the inner stator, the retainer being placed in contact with at least one of at least a portion of an outer peripheral surface of the outer stator and at least a portion of an inner peripheral surface of the inner stator to retain the outer and inner stators together,
wherein the retainer also includes a plurality of connectors joining between the outer stator and the inner stator, the connectors being arranged at given pitches away from each other.

2. The double-stator electric rotating machine as set forth in claim 1, wherein at least one of the outer peripheral surface of the outer stator and the inner peripheral surface of the inner stator has at least one locked portion, and wherein the retainer has a locking portion which engages the locked portion.

3. The double-stator electric rotating machine as set forth in claim 2, wherein the at least one locked portion is located at a reference angular position of the double-stator electric rotating machine.

4. The double-stator electric rotating machine as set forth in claim 1, wherein the retainer also retains a corner of at least one of axially opposed ends of at least one of an outer periphery of the outer stator and an inner periphery of the inner stator.

5. The double-stator electric rotating machine as set forth in claim 1, wherein the retainer includes a hollow cylindrical portion which is placed in contact with at least one of the outer peripheral surface of the outer stator and the inner peripheral surface of the inner stator.

6. The double-stator electric rotating machine as set forth in claim 1, wherein the retainer has at least one of axially opposed ends thereof which is farther away from the connector and is bent to form a hook which grabs at least one of the outer stator and the inner stator.

7. The double-stator electric rotating machine as set forth in claim 1, wherein the connector has a thickness greater than that of the retainer.

8. The double-stator electric rotating machine as set forth in claim 1, wherein the retainer is shrinkage-fit on the outer stator.

9. The double-stator electric rotating machine as set forth in claim 1, wherein the retainer is made of the same material or material containing the same component as that of a core of at least one of the outer stator and the inner stator.

10. The double-stator electric rotating machine as set forth in claim 1, further comprising an electric insulator disposed between the connector of the retainer and at least one of an end of the outer multi-phase winding and an end of the inner multi-phase winding.

11. The double-stator electric rotating machine as set forth in claim 1, wherein the connector of the retainer has a waved portion which occupies a portion or a whole of a surface thereof, the waved portion being defined by a protrusion and a recess, only a protrusion, or only a recess formed on or in a surface of the connector.

12. The double-stator electric rotating machine as set forth in claim 1, wherein the connector of the retainer is equipped with at least one rib which occupies a portion or a whole of a surface thereof.

13. The double-stator electric rotating machine as set forth in claim 1, wherein the retainer includes an assembly of an outer retainer and an inner retainer which hold the outer stator and the inner stator, respectively.

14. The double-stator electric rotating machine as set forth in claim 1, wherein the retainer is made using a press.

* * * * *